US012200317B2

(12) United States Patent
Tanaka

(10) Patent No.: US 12,200,317 B2
(45) Date of Patent: Jan. 14, 2025

(54) TERMINAL AND METHOD

(71) Applicant: 17LIVE Japan inc., Tokyo (JP)

(72) Inventor: Tomohiro Tanaka, Tokyo (JP)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 17/963,464

(22) Filed: Oct. 11, 2022

(65) Prior Publication Data

US 2023/0353841 A1 Nov. 2, 2023

(30) Foreign Application Priority Data

Apr. 27, 2022 (JP) ................................ 2022-073122

(51) Int. Cl.
*H04N 21/81* (2011.01)
*H04N 21/431* (2011.01)

(52) U.S. Cl.
CPC ..... *H04N 21/8146* (2013.01); *H04N 21/4312* (2013.01)

(58) Field of Classification Search
CPC ........................ H04N 21/8146; H04N 21/4312
See application file for complete search history.

(56) References Cited

U.S. PATENT DOCUMENTS

| | | | | |
|---|---|---|---|---|
| 9,563,704 | B1 * | 2/2017 | Greene | G06F 16/5846 |
| 2007/0162341 | A1 * | 7/2007 | McConnell | G06Q 30/0235 |
| | | | | 705/14.35 |
| 2012/0232975 | A1 * | 9/2012 | Hwang | G06Q 30/02 |
| | | | | 705/14.23 |
| 2018/0124477 | A1 * | 5/2018 | Qu | H04N 21/8547 |
| 2020/0273005 | A1 * | 8/2020 | Abrons | G06Q 20/20 |
| 2020/0351560 | A1 * | 11/2020 | Kiyooka | H04N 21/4784 |
| 2021/0168423 | A1 * | 6/2021 | Singh | G06Q 30/0251 |
| 2022/0053227 | A1 * | 2/2022 | Kurabuchi | G06Q 10/101 |
| 2022/0141521 | A1 * | 5/2022 | Lin | H04N 21/2187 |
| | | | | 725/32 |
| 2022/0239985 | A1 * | 7/2022 | Kou | G06F 3/0482 |

FOREIGN PATENT DOCUMENTS

| | | |
|---|---|---|
| JP | 2020-017870 A | 1/2020 |
| JP | 2020-171005 A | 10/2020 |
| JP | 2022-011069 A | 1/2022 |

OTHER PUBLICATIONS

Streamers Playbook, How To Donate/Tip On Twitch | Step By Step Guide, Mar. 25, 2022, pp. 1-13 (Year: 2022).*
Notice of Reasons for Refusal dated Jun. 7, 2022, issued in corresponding Japanese Patent Application No. 2020-073122 with English translation (9 pgs.).

* cited by examiner

*Primary Examiner* — Kyu Chae
(74) *Attorney, Agent, or Firm* — Pillsbury Winthrop Shaw Pittman, LLP

(57) ABSTRACT

A terminal of a viewer who views a live-stream includes one or more processors, and memory storing one or more computer programs configured to be executed by the one or more processors. The one or more computer programs includes instructions for: causing transition from a live-stream screen to a post-stream screen when a distributor of the live-stream ends the live-stream, the live-stream screen showing a video image generated by a terminal of the distributor, the post-stream screen showing a predetermined image; and accepting an instruction to use a gift from the viewer on the post-stream screen.

20 Claims, 21 Drawing Sheets

| Stream ID | Distributor ID | Viewer ID |
|---|---|---|
| ST22 | 001A | SS5, SS12, SS43 |
| ST92 | 002B | TT3,TS2 |

| User ID | Points | Reward |
|---|---|---|
| 001A | 3243 | 1500 |
| ABCFO | 2510 | 800 |
| XX@EEEX | 1803 | 0 |
| KKKOK | 1305 | 0 |

| Gift ID | Given Reward | Price Points | Type |
|---|---|---|---|
| TT01 | 90 | 100 | Normal |
| TE01 | 180 | 200 | Normal |
| S100 | 90 | 100 | See-you |
| S500 | 480 | 500 | See-you |
| S1000 | 900 | 1000 | See-you |
| VV500 | 480 | 500 | See-you |

| Distributor ID | Image Data |
|---|---|
| (Default) | abc.jpeg |
| 001A | ddd.jpeg |

| Stream ID | Gifter ID | Gift ID | Gift Type |
|---|---|---|---|
| ST22 | SS5 | S1000 | Large See-you Gift: 1000pt |
| ST22 | SS12 | S500 | Medium See-you Gift: 500pt |
| ST22 | SS43 | S100 | Small See-you Gift: 100pt |

TERMINAL AND METHOD

CROSS-REFERENCE TO RELATED APPLICATIONS

This application is based on and claims the benefit of priority from Japanese Patent Application Serial No. 2022-073122 (filed on Apr. 27, 2022), the contents of which are hereby incorporated by reference in its entirety.

TECHNICAL FIELD

The present disclosure relates to a terminal and a method.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video distribution services also become popular as storage costs were reduced. And nowadays, with the sophistication of smartphones and further improvements in network speed as typified by 5G, services that enable real-time communication through video, especially live-stream services, are gaining recognition. The number of users of live-stream services is expanding, especially among young people, as such services allow people to share fun moments even when they are in the separate locations from each other.

Gifting, such as tipping, may help live-streamers engage more with viewers and monetize their live-streams. Japanese Patent Application Publication No. 2020-017870 describes a technique to make a live-stream more exciting by showing a Nagesen (tipping) effect with which a donation from a viewer to a live-streamer is shown on the live-streaming screen.

Generally, when a viewer gives a gift during a live-stream, a distributor of the live-stream is able to know who gives what to the distributor in real time through effects and comments, and the distributor is able to immediately take actions such as expressing appreciation or performing. This has become a well-established form of communication between the distributor and viewers in live-streaming.

However, there may be some viewers who wish to discreetly support the distributor. As described above, the current gift use experience does not satisfy such a demand.

SUMMARY

This disclosure was made in view of this drawback, and the object is to provide technology to realize live-streaming that can be enjoyed by more viewers by increasing the variety of gift use experiences in live-streaming.

One aspect of the disclosure relates to a terminal of a viewer who views a live-stream. The terminal includes one or more processors, and memory storing one or more computer programs configured to be executed by the one or more processors. The one or more computer programs includes instructions for: causing transition from a live-stream screen to a post-stream screen when a distributor of the live-stream ends the live-stream, the live-stream screen showing a video image generated by a terminal of the distributor, the post-stream screen showing a predetermined image; and accepting an instruction to use a gift from the viewer on the post-stream screen.

Another aspect of the disclosure also relates to a terminal of a viewer who views a live-stream. The terminal includes one or more processors, and memory storing one or more computer programs configured to be executed by the one or more processors. The one or more computer programs includes instructions for: accepting an instruction to use a first gift from the viewer during the live-stream; causing transition from a live-stream screen to a post-stream screen when a distributor of the live-stream ends the live-stream, the live-stream screen showing a video image generated by a terminal of the distributor, the post-stream screen showing a predetermined image; and accepting an instruction to use a second gift from the viewer on the post-stream screen. Notification related to the used first gift is provided to the distributor in real time, and notification related to the used second gift is provided to the distributor in non-real time.

Yet another aspect of the disclosure relates to a method. The method includes: causing a screen of a terminal of a viewer who views a live-stream to transition from a live-stream screen to a post-stream screen when a distributor of the live-stream ends the live-stream, the live-stream screen showing a video image generated by a terminal of the distributor, the post-stream screen showing a predetermined image; and accepting an instruction to use a gift from the viewer on the post-stream screen.

The one or more computer programs further includes instructions for: accepting an instruction to stop viewing the live-stream from the viewer; and upon quit viewing of the live-stream, showing a screen for asking the viewer whether to use the gift for the distributor of the live-stream on a display.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

This disclosure was made in view of this drawback, and the object is to provide technology to realize live-streaming that can be enjoyed by more viewers by increasing the variety of gift use experiences in live-streaming.

BRIEF DESCRIPTION OF THE DRAWINGS

FIG. 4 is a data structure diagram of an example of a stream DB in FIG. 3.

FIG. 5 is a data structure diagram showing an example of a user DB in FIG. 3.

FIG. 6 is a data structure diagram showing an example of a gift DB in FIG. 3.

FIG. 7 is a data structure diagram showing an example of a post-stream image DB in FIG. 3.

FIG. 8 is a data structure diagram showing an example of an off-stream acquired gift DB in FIG. 3.

DETAILED DESCRIPTION

Like elements, components, processes, and signals throughout the Figures are labeled with same or similar designations and numbering, and the description for the like elements will not be hereunder repeated. For purposes of clarity and brevity, some of the components that are less related and thus not described are not shown in Figures.

A live-streaming system of an embodiment provides a system that allows viewers to give gifts to a distributor for a certain period of time when a live-stream ends or a viewer exits the live-stream. In this system, basically, there is no real-time notification of gifting to a distributor but a live-stream analysis screen, which can be viewed after the live-stream is closed or ends, shows who have given gifts.

According to this system, viewers are able to give gifts to a distributor without real-time notification, so the viewers can casually send gifts, just like saying "See you!" or "Have a nice weekend!", to the distributor. This will achieve a live-streaming platform on which viewers who wish to discreetly support the distributor can also enjoy gifting.

Figure 1:
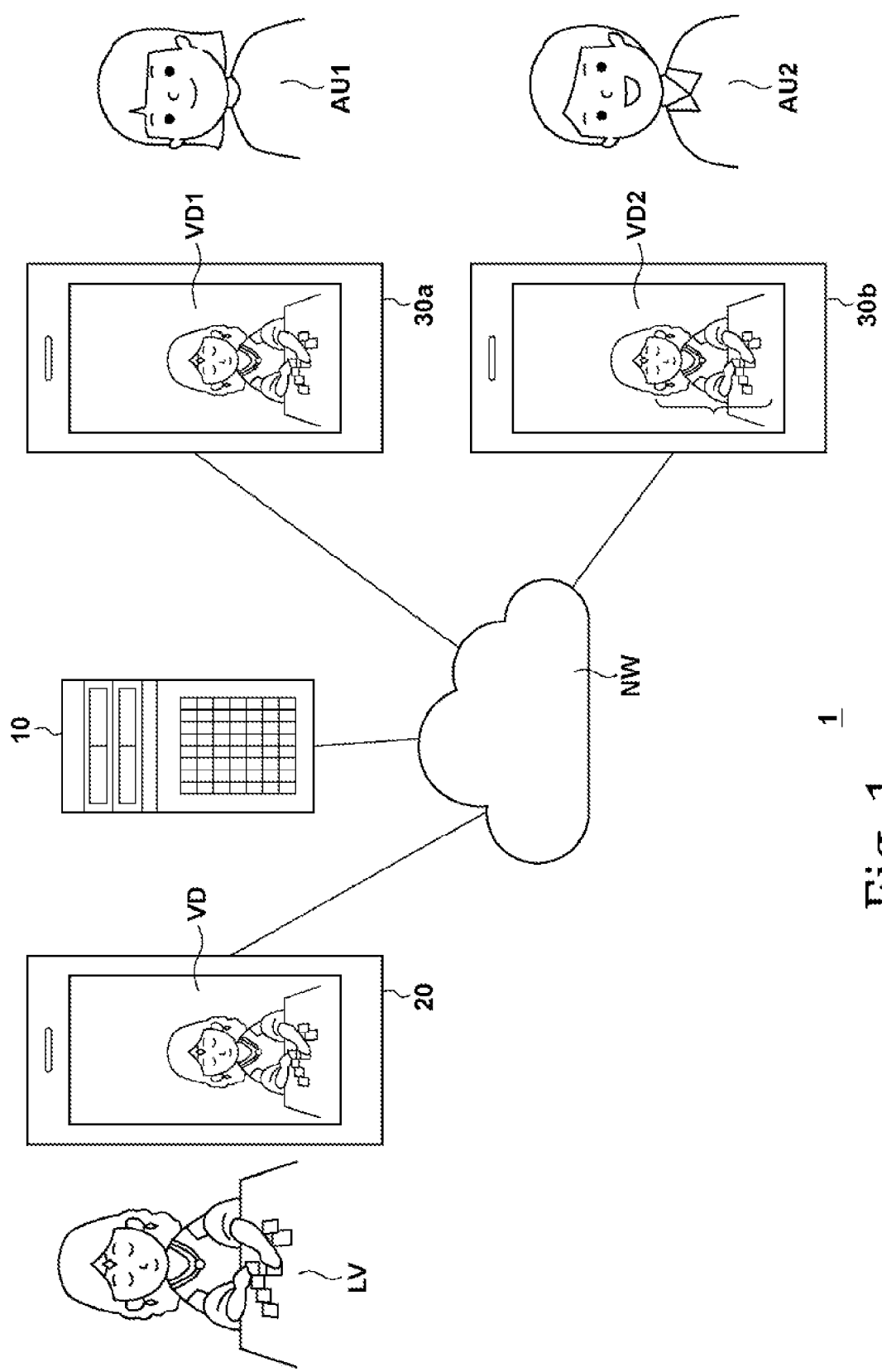
FIG. 1 schematically illustrates a configuration of a live-streaming system in one embodiment of the disclosure.

FIG. 1 schematically illustrates a configuration of a live-streaming system 1 according one embodiment of the disclosure. The live-streaming system 1 provides an interactive live-stream service that allows a distributor LV (also referred to as a liver or streamer) and a viewer AU (also referred to as audience) (AU1, AU2 . . . ) to communicate in real time. As shown in FIG. 1, the live-streaming system 1 includes a server 10, a user terminal 20 on the distributor side, and user terminals 30 (30*a*, 30*b* . . . ) on the audience side. The distributor and viewers may be collectively referred to as users. The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal 20, and the user terminal 30 are interconnected so as to be able to communicate with each other over the various wired or wireless network NW.

The live-streaming system 1 involves the distributor LV, the viewers AU, and an administrator (not shown) who manages the server 10. The distributor LV is a person who broadcasts contents in real time by recording the contents with his/her user terminal 20 and uploading them directly to the server 1. Examples of the contents may include the distributor's own songs, talks, performances, fortune-telling, gameplays, and any other contents. In the embodiment, the distributor LV tells viewer AU's fortune in a live stream. The administrator provides a platform for live-streaming contents on the server 10, and also mediates or manages real-time interactions between the distributor LV and the viewers AU. The viewer AU accesses the platform at his/her user terminal 30 to select and view a desired content. During live-streaming of the selected content, the viewer AU performs operations to comment, cheer, or ask fortune-telling via the user terminal 30, the distributor LV who is delivering the content responds to such a comment, cheer, or request and such response is transmitted to the viewer AU via video and/or audio, thereby establishing an interactive communication.

The term "live-streaming" may mean a mode of data transmission that allows a content recorded at the user terminal 20 of the distributor LV to be played and viewed at the user terminals 30 of the viewers AU substantially in real time, or it may mean a live broadcast realized by such a mode of transmission. The live-streaming may be achieved using existing live delivery technologies such as HTTP Live Streaming, Common Media Application Format, Web Real-Time Communications, Real-Time Messaging Protocol and MPEG DASH. Live-streaming includes a transmission mode in which the viewers AU can view a content with a specified delay simultaneously with the recording of the content by the distributor LV. As for the length of the delay, it may be acceptable for a delay even with which interaction between the distributor LV and the viewers AU can be established. Note that the live-streaming is distinguished from so-called on-demand type transmission, in which the entire recorded data of the content is once stored on the server, and the server provides the data to a user at any subsequent time upon request from the user.

The term "video data" herein refers to data that includes image data (also referred to as moving image data) generated using an image capturing function of the user terminals 20 and 30, and audio data generated using an audio input function of the user terminals 20 and 30. Video data is reproduced in the user terminals 20 and 30, so that the users can view contents. In this embodiment, it is assumed that between video data generation at the distributor's user terminal and video data reproduction at the viewer's user terminal, processing is performed onto the video data to change its format, size, or specifications of the data, such as compression, decompression, encoding, decoding, or transcoding. However, the content (e.g., video images and audios) represented by the video data before and after such processing does not substantially change, so that the video data after such processing is herein described as the same as the video data before such processing. In other words, when video data is generated at the distributor's user terminal and then played back at the viewer's user terminal via the server 10, the video data generated at the distributor's user terminal, the video data that passes through the server 1, and the video data received and reproduced at the viewer's user terminal are all the same video data.

In the example in FIG. 1, the distributor LV is live-streaming his/her fortune telling. The user terminal 20 of the distributor LV generates video data by recording images and sounds of the distributor LV telling fortune, and the generated data is transmitted to the server 10 over the network NW. At the same time, the user terminal 20 displays a recorded video image VD of the distributor LV on the display of the user terminal 20 to allow the distributor LV to check the live stream currently performed.

The user terminals 30*a* and 30*b* of the viewers AU1 and AU2 respectively, who have requested the platform to view the live-stream of the distributor LV, receive video data related to the live-stream (may also be herein referred to as "live-streaming video data") over the network NW and reproduce the received video data to display video images VD1 and VD2 on the displays and output audio through the speakers. The video images VD1 and VD2 displayed at the user terminals 30*a* and 30*b*, respectively, are substantially the same as the video image VD captured by the user terminal 20 of the distributor LV, and the audio outputted at the user terminals 30*a* and 30*b* is substantially the same as the audio recorded by the user terminal 20 of the distributor LV.

Recording of the images and sounds at the user terminal 20 of the distributor LV and reproduction of the video data at the user terminals 30*a* and 30*b* of the viewers AU1 and AU2 are performed substantially simultaneously. Once the viewer AU1 types a comment about the fortune told by the distributor LV on the user terminal 30*a*, the server 10 displays the comment on the user terminal 20 of the distributor LV in real time and also displays the comment on the user terminals 30*a* and 30*b* of the viewers AU1 and AU2, respectively. When the distributor LV reads the comment and develops his/her talk to cover and respond the comment, the video and sound of the talk are displayed on the user terminals 30*a* and 30*b* of the viewers AU1 and AU2, respectively. This interactive action is recognized as establishment of a conversation between the distributor LV and the viewer AU1. In this way, the live-streaming system 1 realizes the live-streaming that enables the interactive communication, not one-way communication.

Figure 2:
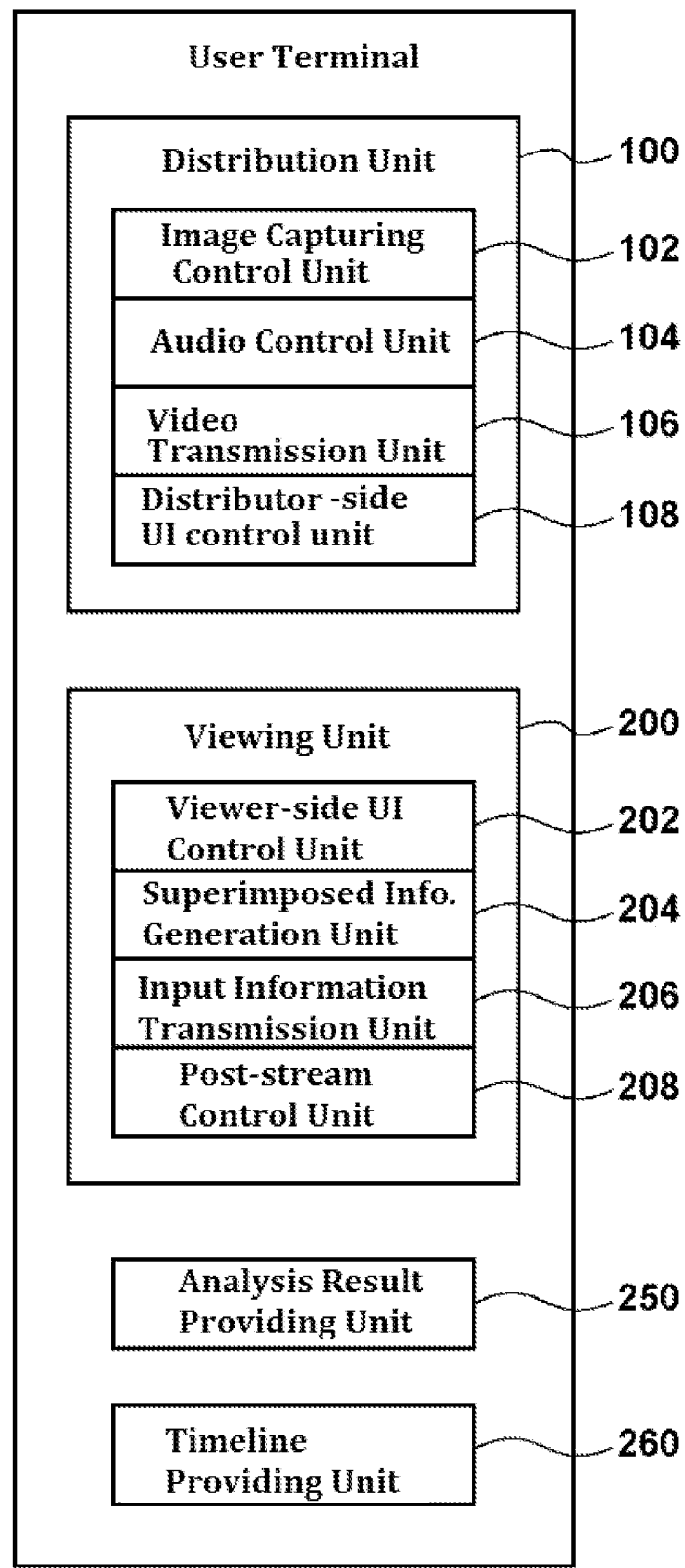
FIG. 2 is a block diagram showing functions and configuration of a user terminal of FIG. 1.

FIG. 2 is a block diagram showing functions and configuration of the user terminal 20 of FIG. 1. The user terminal 30 has the same functions and configuration as the user terminal 20. Each block in FIG. 2 and the subsequent block diagrams may be realized by elements such as a computer CPU or a mechanical device in terms of hardware, and can be realized by a computer program or the like in terms of software. Functional blocks realized by cooperative operation between these elements. Therefore, it is understood by those skilled in the art that these functional blocks can be realized in various forms by combining hardware and software.

The distributor LV and the viewers AU download and install a live-streaming application program (hereinafter referred to as a live-streaming application) according to the embodiment to the user terminals 20 and 30 from a download site over the network NW. Alternatively, the live-streaming application may be pre-installed on the user terminals 20 and 30. When the live-streaming application is executed on the user terminals 20 and 30, the user terminals 20 and 30 communicate with the server 10 over the network NW to implement various functions. Hereinafter, the functions implemented by the user terminals 20 and 30 (processors such as CPUs) in which the live-streaming application is run will be described as functions of the user terminals 20 and 30. These functions are realized in practice by the live-streaming application on the user terminals 20 and 30. In any other embodiments, these functions may be realized by a computer program that is written in a programming language such as HTML (HyperText Markup Language), transmitted from the server 10 to web browsers of the user terminals 20 and 30 over the network NW, and executed by the web browsers.

The user terminal 20 includes a distribution unit 100 that generates video data in which the user's image and sound are recorded and provides the video data to the server 10, a viewing unit 200 to which the video data is provided from the server 10 to reproduce the video data, an analysis result providing unit 250, and a timeline providing unit 260. The user activates the distribution unit 100 when the user performs live-streaming, and activates the viewing unit 200 when the user views a video. The user terminal in which the distribution unit 100 is activated is the distributor's terminal, i.e., the user terminal that generates the video data, and the user terminal in which the viewing unit 200 is activated is the viewer's terminal, i.e., the user terminal is which the video data is reproduced and played.

The distribution unit 100 includes an image capturing control unit 102, an audio control unit 104, a video transmission unit 106, and a distributor-side UI control unit 108. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time. The distributor-side UI control unit 108 controls an UI for the distributor. The distributor-side UI control unit 108 is connected to a display (not shown in FIG. 2), and displays a video on the display by reproducing the video data that is to be transmitted by the video transmission unit 106. The distributor-side UI control unit 108 displays an operation object or an instruction-accepting object on the display, and accepts inputs from the distributor who taps on the object.

The viewing unit 200 includes a viewer-side UI control unit 202, a superimposed information generation unit 204, and an input information transmission unit 206, and a post-stream control unit 208. The viewing unit 200 receives, from the server 10 over the network NW, the video data related to the live-stream in which the distributor and viewers participate. The viewer-side UI control unit 202 controls the UI for the viewers. The viewing-side UI control unit 202 is connected to a display and speaker (not shown in FIG. 2), and reproduces the received video data to display video images on the display and output audio through the speaker. The state where the image is outputted to the display and the audio is outputted from the speaker can be referred to as "the video data is played". The viewer-side UI control unit 202 is also connected to input means (not shown in FIG. 2) such as touch panels, keyboards, and displays, and obtains user input via these input means. The superimposed information generation unit 204 superimposes a predetermined frame image on an image generated from the video data from the server 10. The frame image includes various user interface objects (hereinafter simply referred to as "objects") for accepting inputs from the user, comments entered by the viewers, and information obtained from the server 10. The input information transmission unit 206 transmits the user input obtained by the viewer-side UI control unit 202 to the server 10 over the network NW.

The post-stream control unit 208 controls a process that is performed when the distributor ends his/her live-stream and when a viewer stops watching the live-stream. The post-stream control unit 208 accepts an instruction from the viewer to use a See-you gift (Otsukare gift) only within a predetermined period of time after the distributor ends the live-stream (hereinafter referred to as "collection period"). The post-stream control unit 208 accepts the instruction for use of the See-you gift by a viewer after the viewer stops watching the live-stream. The function of the post-stream control unit 208 will be later described in details.

The analysis result providing unit 250 provides an analysis of a past live-stream(s) to the distributor. When the analysis result providing unit 250 receives, from the distributor, an instruction to display an analysis result, it generates an analysis result request and sends it to the server 10 over the network NW. The analysis result providing unit 250 receives the analysis result from the server 10. Based on the received analysis result, the analysis result providing unit 250 generates a live-stream analysis screen described below, which includes information related to the live-stream, and the screen is shown on the display.

The timeline providing unit 260 retrieves user's timeline information from the server 10 and presents it to the user. When the timeline providing unit 260 receives a timeline display instruction from a user, it generates a timeline request and sends it to the server 10 over the network NW. The timeline providing unit 260 receives the timeline information from the server 10. The timeline providing unit 260 generates a timeline screen, which will be later described, based on the received timeline information and shows the timeline screen on the display.

Figure 3:
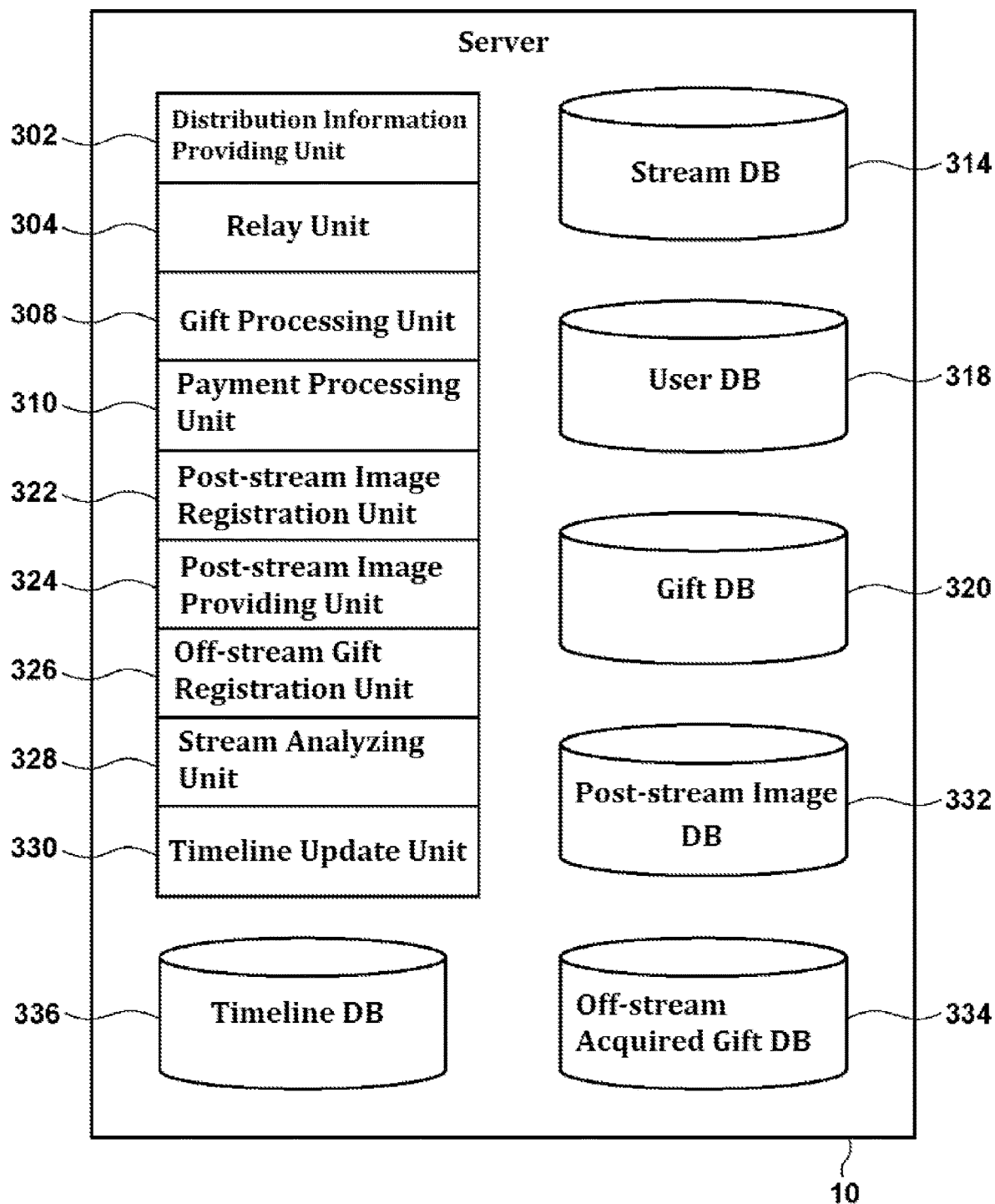
FIG. 3 is a block diagram showing functions and configuration of a server of FIG. 1.

FIG. 3 is a block diagram showing functions and configuration of the server of FIG. 1. The server 10 includes a distribution information providing unit 302, a relay unit 304, a gift processing unit 308, a payment processing unit 310, a post-stream image registration unit 322, a post-stream image providing unit 324, an off-stream gift registration unit 326, a stream analyzing unit 328, a timeline update unit 330, a stream DB 314, a user DB 318, a gift DB 322, a post-stream image DB 332, an off-stream acquired gift DB 334, and a timeline DB 336 which holds the timeline information for each user.

FIG. 4 is a data structure diagram of an example of the stream DB 314 of FIG. 3. The stream DB 314 holds information regarding a live-stream currently taking place. The stream DB 314 stores a stream ID for identifying a live-stream on a live distribution platform provided by the live-streaming system 1, a distributor ID, which is a user ID for identifying the distributor who provides the live-stream, and a viewer ID, which is a user ID for identifying a viewer of the live-stream, in association with each other. In the live-streaming platform provided by the live-streaming system 1 of the embodiment, when a user live-streams, the user becomes a distributor, and when the same user views a live-stream broadcast by another user, the user also becomes a viewer. Therefore, the distinction between a distributor and a viewer is not fixed, and a user ID registered as a distributor ID at one time may be registered as a viewer ID at another time.

FIG. 5 is a data structure diagram showing an example of the user DB 318 of FIG. 3. The user DB 318 holds information regarding users. The user DB 318 stores a user ID for identifying a user, points held by the user, and a reward given to the user, in association with each other. The point is the electronic value circulated within the live-streaming platform. Users are able to purchase points by credit card or other means of payment. A reward is used to determine the amount of money a distributor receives from the administrator of the live-streaming platform. On the live-streaming platform, when viewers give gifts to the distributor during or after his/her live-stream, the viewer's points are consumed and the distributor's reward is increased by a corresponding amount.

FIG. 6 is a data structure diagram showing an example of the gift DB 320 of FIG. 3. The gift DB 320 holds information regarding gifts available for the viewers in the live-streaming. A gift is electronic data with the following characteristics:

It can be purchased in exchange for the points or money, or can be given for free.

It can be given by a viewer to a distributor.—Giving a gift to a distributor is also referred to as using the gift or throwing the gift.

Some gifts may be purchased and used at the same time, and some gifts may be purchased and then used at any time later by the purchaser viewer.

When a viewer gives a gift to a distributor, the distributor is given a corresponding reward.

When a gift is used, the use may trigger an effect associated with the gift. For example, an effect corresponding to the gift will appear on the live-streaming room screen.

The gift DB 320 stores a gift ID for identifying a gift, a granted reward, which is a reward given to a distributor when the gift is given to the distributor, price points, which is the amount of points to be paid for use of the gift, and a type of the gift, in association with each other. A viewer is able to give a desired gift to a distributor by paying the price points of the desired gift while viewing the live-stream. The payment of the price points may be made by an appropriate electronic payment means. For example, the payment may be made by the viewer paying the price points to the administrator. Alternatively, bank transfers or credit card payments may be used. The administrator is able to desirably set the relationship between the granted reward and the price points. For example, it may be set as the granted reward=the price points. Alternatively, points obtained by multiplying the granted reward by a predetermined coefficient such as 1.2 may be set as the price points, or points obtained by adding predetermined fee points to the granted reward may be set as the price points.

The type of gift indicates whether the gift is a normal gift or the See-you gift. The normal gift is a gift that can be used in a live stream and is disabled before and after the live stream. The See-you gift is a gift that can be used before or after the live stream, preferably within the collection period after the distributor ends the live stream and only when the viewer stops watching the live stream.

FIG. 7 is a data structure diagram showing an example of the post-stream image DB 332 in FIG. 3. The post-stream image DB 332 holds post-stream images displayed on the viewer's user terminal 30 during the collection period. The post-stream image DB 332 stores the distributor ID of the distributor and image data of a post-stream image registered by the distributor in association with each other. In the example of FIG. 7, the post-stream image DB 332 stores, as the image data corresponding to the distributor ID=(default), image data of a common post-stream image displayed after the live stream of the distributor whose post-stream image has not been registered.

FIG. 8 is a data structure diagram showing an example of the off-stream acquired gift DB 334 in FIG. 3. The off-stream acquired gift DB 334 holds information related to gifts received by the distributor outside of the live streaming. The off-stream acquired gift DB 334 holds information related to the See-you gifts received by the distributor within the collection period after the end of his/her live-stream and information related to the See-you gifts received from viewers at the time when the viewers stop watching the live stream. The off-stream acquired gift DB 334 holds the stream ID of the live stream that has ended or that the viewer stopped watching, a gifter ID for identifying the viewer who used a See-you gift, and the gift ID for identifying the See-you gift used by the viewer and a gift type of the See-you gift, in association with each other.

Referring again to FIG. 3, upon reception of a notification from the user terminal 20 on the distributor side that the distributor starts a live-stream over the network NW, the distribution information providing unit 302 registers a stream ID for identifying this live-stream and the distributor ID of the distributor who performs the live-stream in the stream DB 314. When the distribution information providing unit 302 receives a request to provide information about live-streams from the viewing unit 200 of the user terminal 30 on the viewer side over the network NW, the distribution information providing unit 302 retrieves currently available live-streams from the stream DB 314 and makes a list of the available live-streams. The distribution information providing unit 302 transmits the generated list to the requesting user terminal 30 over the network NW. The viewer-side UI control unit 202 of the requesting user terminal 30 generates a live-stream selection screen based on the received list and displays it on the display of the user terminal 30.

Once the input information transmission unit 206 of the user terminal 30 received the viewer's selection result of the live-stream on the live-stream selection screen, the input information transmission unit 206 generates a distribution request including the stream ID of the selected live-stream, and transmits the request to the server 10 over the network NW. The distribution information providing unit 302 starts providing, to the requesting user terminal 30, the live-stream specified by the stream ID included in the received distribution request. The distribution information providing unit 302 updates the stream DB 314 to include the user ID of the viewer of the requesting user terminal 30 into the viewer IDs of the stream ID.

The relay unit 304 relays the video data from the distributor-side user terminal 20 to the viewer-side user terminal 30 in the live-streaming started by the distribution information providing unit 302. The relay unit 304 receives from the input information transmission unit 206 a signal that represents user input by a viewer during the live-stream or reproduction of the video data. The signal that represents user input may be an object specifying signal for specifying an object displayed on the display of the user terminal 30, and the object specifying signal includes the viewer ID of the viewer, the distributor ID of the distributor of the live-stream that the viewer watches, and an object ID that identifies the object. When the object is a gift, the object ID is the gift ID. Similarly, the relay unit 304 receives from the distribution unit 100 of the user terminal 20 a signal that represents user input performed by the distributor during reproduction of the video data, such as the object specifying signal.

When the relay unit 304 receives a live-stream viewing stop signal indicating that a viewer has stopped viewing the live-stream from the user terminal 30 of the viewer, it stops transmission of video related to the live stream to the user terminal 30 from which the signal has transmitted. The live-stream viewing stop signal includes the viewer ID of the viewer and the stream ID of the live-stream that the viewer has stopped watching. The relay unit 304 also updates the stream DB 314 so that the viewer ID included in the received live-stream viewing stop signal is removed from the viewer IDs related to the stream ID included the received live-stream viewing stop signal does not include.

The gift processing unit 308 updates the user DB 318 so as to increase the reward of the distributor depending on a granted reward of the gift identified by the gift ID included in the object specifying signal. Specifically, the gift processing unit 308 refers to the gift DB 320 to specify a reward to be granted for the gift ID included in the received object specifying signal. The gift processing unit 308 then updates the user DB 318 to add the determined granted reward to the reward of the distributor ID included in the object specifying signal.

The payment processing unit 310 processes payment of a price of a gift by a viewer in response to reception of the object specifying signal. Specifically, the payment processing unit 310 refers to the gift DB 320 to specify the price points of the gift identified by the gift ID included in the object specifying signal. The payment processing unit 310 then updates the user DB 318 to subtract the specified price points from the points of the viewer identified by the viewer ID included in the object specifying signal.

The post-stream image registration unit 322 accepts pre-registration of a post-stream image(s) by a distributor. The user terminal 20 of the distributor shows a screen for accepting the input of the post-stream image on the display, and the distributor inputs a desired post-stream image on the screen. Upon input of the post-stream image, the user terminal 20 generates a post-stream image registration request including the post-stream image, and transmits the post-stream image registration request to the server 10 over the network NW. Upon receipt of the post-stream image registration request from the user terminal 20 of the distributor, the post-stream image registration unit 322 associates the post-stream image included in the request with the distributor ID of the distributor who sent the request and registers the image in the post-stream image DB 332. In this way, the distributor is able to pre-register the post-stream image.

Once the post-stream image providing unit 324 receives a notification from the user terminal 20 of the distributor that he/she ends the live-stream, the post-stream image providing unit 324 obtains the post-stream image associated with the distributor ID of the distributor from the post-stream image registration unit 322. The post-stream image providing unit 324 obtains the post-stream image when there is no pre-registration of the image. The post-stream image providing unit 324 transmits the obtained post-stream image to the user terminals 30 of a viewer(s) who has been watching the live-stream until the end of the live-stream over the network NW. The post-stream image providing unit 324 refers to the stream DB 314 to identify the viewer(s) (the user terminal(s) 30 of the viewer(s) to whom the post-stream image is to be transmitted. The user terminal 30 generates a post-stream screen from the post-stream image. The post-stream screen is displayed on the display of the user terminal 30 during the collection period of the finished live-stream.

The off-stream gift registration unit 326 registers, in the off-stream acquired gift DB 334, information about gifts given from the viewers to the distributor (or from the user to another user) outside of the live-stream. In particular, the off-stream gift registration unit 326 registers, in the off-stream acquired gift DB 334, the information about the See-you gifts that can be used within the collection period. The off-stream gift registration unit 326 also registers, in the off-stream acquired gift DB 334, information about See-you gifts given when the viewers stop viewing the live-stream.

The See-you gift is a gift that is used outside of the live-stream, but a reward giving process and payment process associated with the use of the See-you gift conform to those of the normal gift used in the live-stream. A difference between the normal gift and the See-you gift is whether a notification of it is made in real-time or not. Notification related to the normal gift is provided to the distributor in real time. Whereas notification related the See-you gift is provided to the distributor in non-real time. For example, when the normal gift is used in the live-stream, a corresponding effect is shown on the viewer's user terminal 30 and the distributor's user terminal 20, so the distributor is able to know the use of the normal gift in real time. Whereas when the See-you gift is used in the collection period, such an effect is generated. As will be described later, the use of the See-you gift is notified to the distributor in non-real time through the live-stream analysis screen.

Upon receipt of an analysis result request from the distributor's user terminal 20, the stream analysis unit 328 analyzes various metrics of the distributor's past live-streams (the number of viewers, number of new viewers, stream time, earned points, earned reward, etc.) and generate an analysis result. The stream analysis unit 328 also refers to the off-stream acquired gift DB 334 to obtain information about the See-you gifts used during the collection periods of the target past live-streams and information about the See-you gifts used at the timing when the viewers stopped watching the live-streams before they end to include the information in the analysis result. The stream analysis unit 328 transmits the generated analysis result to the requesting user terminal 20.

The timeline update unit 330 updates the timeline DB 336. Upon receipt of a timeline request from the user terminal of a user, the timeline update unit 330 retrieves timeline information of the user from the timeline DB 336. The timeline update unit 330 transmits the obtained timeline information to the user terminal of the requesting user.

Figure 9:
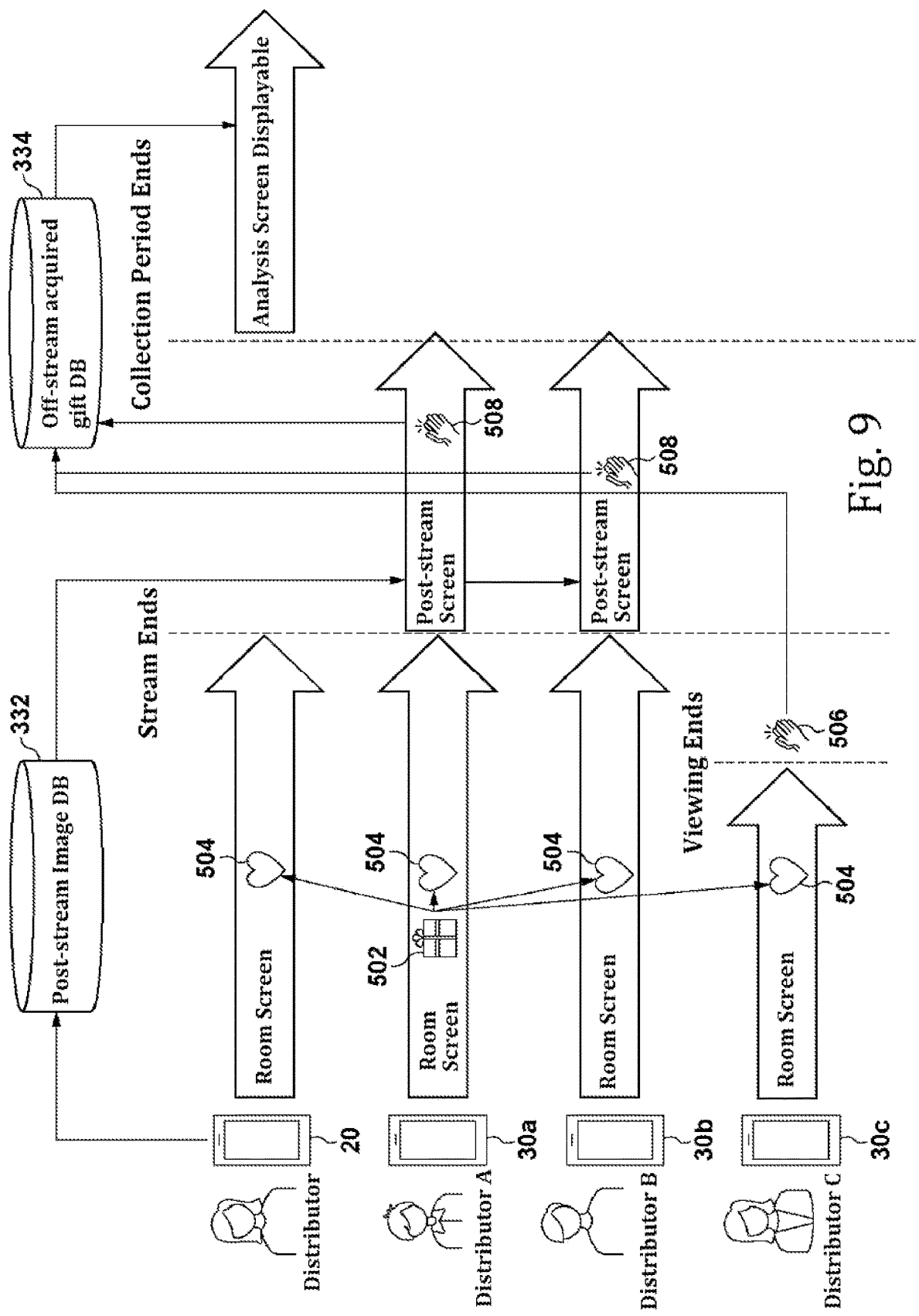
FIG. 9 schematically illustrates processes performed in a live-streaming system before and after a distributor ends a live-stream.

The operation of the live-streaming system 1 with the above configuration will be now described. FIG. 9 schematically illustrates processes performed in the live-streaming system 1 before and after the distributor ends his/her live-stream. In FIG. 9, the processes are illustrated in chronological order from left to right, so the description will be hereunder given along that flow. First, the distributor generates a desired post-stream image with his own user terminal 20 before starting live-streaming. The user terminal 20 transmits the generated post-stream image to the server 10. The post-stream image registration unit 322 of the server 10 registers the received post-stream image in the post-stream image DB 332.

The distributor live-streams using his/her own user terminal 20, and viewers A, B, and C view the live-stream on respective user terminals 30a, 30b, and 30c. The live-streaming room screen is displayed on the displays of the user terminal 20 and the user terminals 30a, 30b, and 30c. When the viewer A uses a normal gift 502 during this live-stream, a corresponding effect 504 and comment "Viewer A gave a normal gift" are displayed on the live-streaming room screens of the user terminals 20, 30a, 30b, and 30c. This process is realized by the following steps. The user terminal 30a of the viewer A first generates an object specifying signal including the gift ID of the normal gift 502 and transmits it to the server 10. The gift processing unit 308 of the server 10 extracts the gift ID and and the viewer ID from the received object specifying signal and includes them in an effect generation instruction signal. The gift processing unit 308 then transmits the effect generation instruction signal to the user terminal 20 of the distributor and the user terminals 30b and 30c of the other viewers B and C, respectively. Each user terminal displays the effect and comment based on the received effect generation instruction signal. In this way, the distributor is able to know in real time that the viewer A has given him/her the normal gift.

In this example, the viewer C stops viewing the live-stream before the distributor ends the live-stream. The user terminal 30c of the viewer C displays a dialog asking the viewer C whether to send a See-you gift 506 to the distributor immediately after accepting the instruction to stop viewing and stopping the display of the live-streaming room screen. Upon selection of gifting by the viewer C, the user terminal 30c generates a See-you gift use signal indicating the use of the See-you gift 506 and transmits it to the server 10. The See-you gift use signal includes the viewer ID of the viewer who used the See-you gift, the stream ID identifying the live-stream which the viewer stopped watching, the distributor ID of the distributor of the live-stream, and the gift ID identifying the used See-you gift. The gift processing unit 308 and the payment processing unit 310 of the server 10 perform the reward giving process and the price payment process, respectively, based on the received See-you gift use signal. Upon receipt of the See-you gift use signal, the off-stream gift registration unit 326 of the server 10 refers to the gift DB 320 and specifies the type of the See-you gift corresponding to the gift ID included in the signal. The off-stream gift registration unit 326 adds a new entry to the off-stream acquired gift DB 334 based on the information included in the received See-you gift use signal and the specified type of the See-you gift. The stream ID, gifter ID, gift ID, and gift type of this entry are set as the stream ID included in the received See-you gift use signal, the viewer ID included in the signal, the gift ID, and the specified See-you gift type, respectively.

Figure 10:
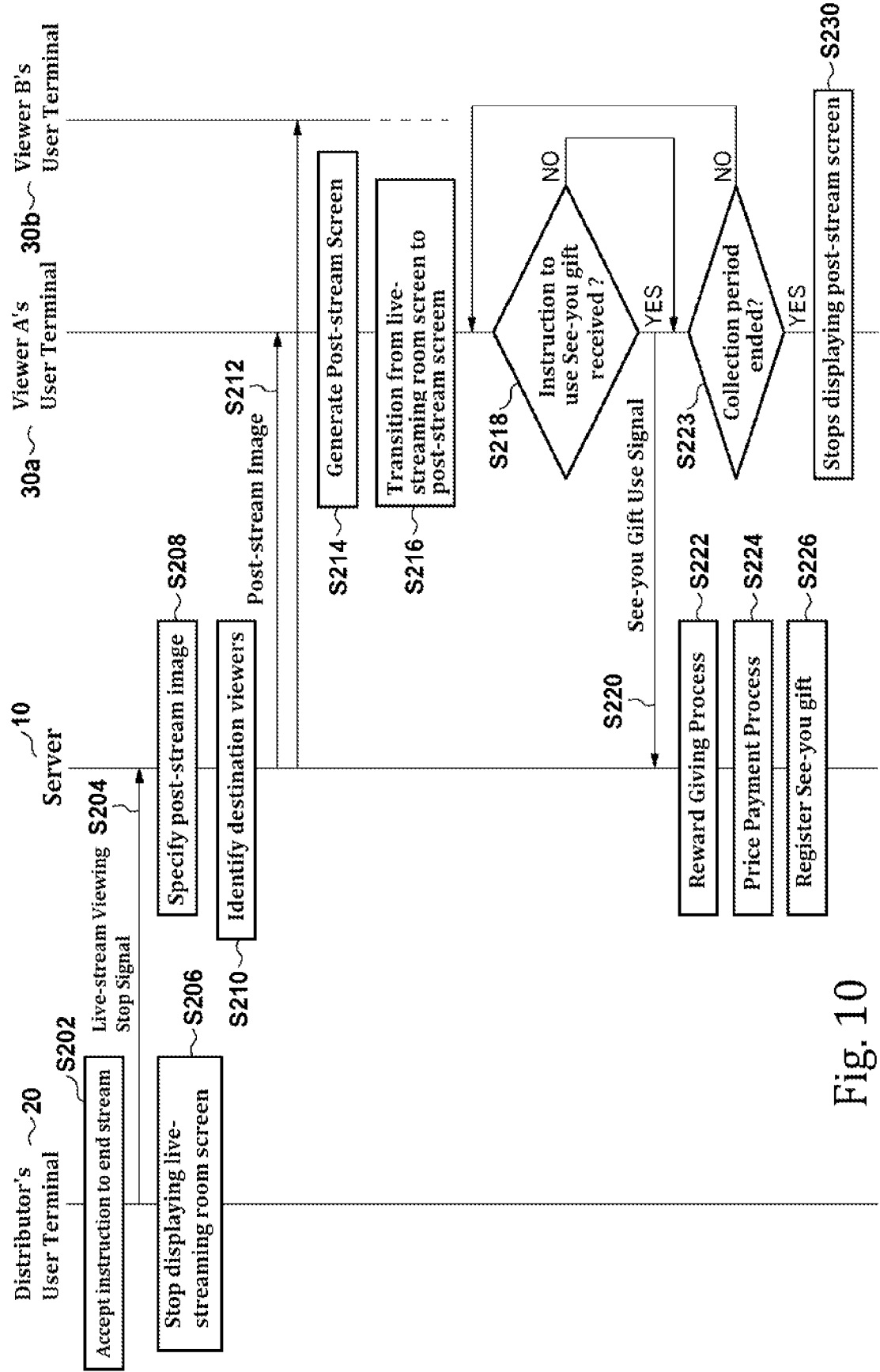
FIG. 10 is a flow chart of the processes performed in the live-streaming system before and after the distributor stops the live-stream.

FIG. 10 is a flow chart of the processes performed in the live-streaming system before and after the distributor ends the live-stream. It will be described with reference to FIGS. 9 and 10. The distributor-side UI control unit 108 of the distributor's user terminal 20 accepts a streaming end instruction for ending the live-stream from the distributor (S202). Upon receipt of the streaming end instruction, the distributor-side UI control unit 108 generates a live-stream end signal indicating the end of the live-stream, and transmits it to the server 10 over the network NW (S204). The live-stream end signal includes the distributor ID of the distributor and the stream ID of the live-stream that is to be ended by the distributor. Upon receipt of the streaming end instruction, the distributor-side UI control unit 108 stops displaying the live-streaming room screen (S206). As a result, the display of the distributor's user terminal 20 may be changed to a predetermined screen such as a home screen of the live streaming application.

Upon receipt of the live-stream end signal, the post-stream image providing unit 324 of the server 10 refers to the post-stream image DB 332 and identifies the post-stream image corresponding to the distributor ID included in the signal (S208). The post-stream image providing unit 324 refers to the stream DB 314 and identifies the viewer IDs corresponding to the stream ID included in the live-stream end signal as the viewer IDs of the viewers to whom the post-stream image is to be sent (S210). The viewers with the viewer IDs identified in this way is the viewers who were watching the live-stream when the distributor ended the live-stream. The post-stream image providing unit 324 refers to the gift DB 320 and specifies the gift IDs of available See-you gifts. The post-stream image providing unit 324 transmits the post-stream image and the gift ID specified in step S208 to the viewer's user terminal 30 specified in step S210 over the network NW (S212). In the example of FIGS. 9 and 10, the viewers A and B are specified as the destination viewers in step S210, and the post-stream image is transmitted to the viewer A's user terminal 30a and viewer B's user terminal 30b.

Upon receipt of the post-stream image and the gift ID from the server 10, the post-stream control unit 208 of the user terminal 30a of the viewer A generates a post-stream screen that includes the post-stream image and a gift object of the See-you gift (S214). The post-stream control unit 208 makes transition from the live-streaming room screen to the post-stream screen (S216) on the display of the user terminal 30a. The post-stream control unit 208 receives an instruction to use the See-you gift on the post-stream screen (S218). Upon receipt of the instruction to use the See-you gift (Y in S218), the post-stream control unit 208 generates a See-you gift use signal and transmits it to the server 10 over the network NW (S220). The See-you gift use signal includes the viewer ID of the viewer who used the See-you gift, the stream ID identifying the ended live-stream, the distributor ID of the distributor of the live-stream, and the gift ID identifying the used See-you gift. The gift processing unit 308 and the payment processing unit 310 of the server 10 perform the reward giving process (S222) and the price payment process (S244, respectively, based on the received See-you gift use signal. Upon receipt of the See-you gift use signal, the off-stream gift registration unit 326 of the server 10 refers to the gift DB 320 and specifies the type of the See-you gift corresponding to the gift ID included in the signal. The off-stream gift registration unit 326 adds a new entry to the off-stream acquired gift DB 334 based on the information included in the received See-you gift use signal and the specified type of the See-you gift (S226). The stream ID, gifter ID, gift ID, and gift type of this entry are set as the stream ID included in the received See-you gift use signal, the viewer ID included in the signal, the gift ID, and the specified See-you gift type, respectively. In the example of FIG. 9, the viewers A and B use a See-you gift 508 during the collection period.

When there is no use of the See-you gift in step S218, or after the See-you gift use signal is generated and transmitted, the post-stream control unit 208 determines whether the collection period has ended (S228). The length of the collection period can be adequately set by the administrator. For example, the length of the collection period may be set to 30 seconds, 1 minute, 3 minutes, or the like. The post-stream control unit 208 has a timer function, and the timer starts counting from when the screen changes in step S216. In step S228, the count of the timer and the length of the collection period are compared, and when the former is smaller than the latter, the process returns to step S218. Otherwise, the process proceeds to step S230. After the collection period ends, the post-stream control unit 208 stops displaying the post-stream screen (S230). As a result, the display of the user terminal 30a of the viewer A may be changed to a predetermined screen such as the home screen of the live streaming application. At the user terminal 30b of the viewer B, the same processing as in the user terminal 30a of the viewer A is performed.

After the end of the collection period of the live-stream ended by the distributor, the distributor is allowed to view the live-stream analysis screen of the live-stream. As described above, the analysis result providing unit 250 of the user terminal 20 generates the live-stream analysis screen in response to a request from the distributor and shows the screen on the display. This live-stream analysis screen includes information about the See-you gift held in the off-stream acquired gift DB 334.

Figure 11:
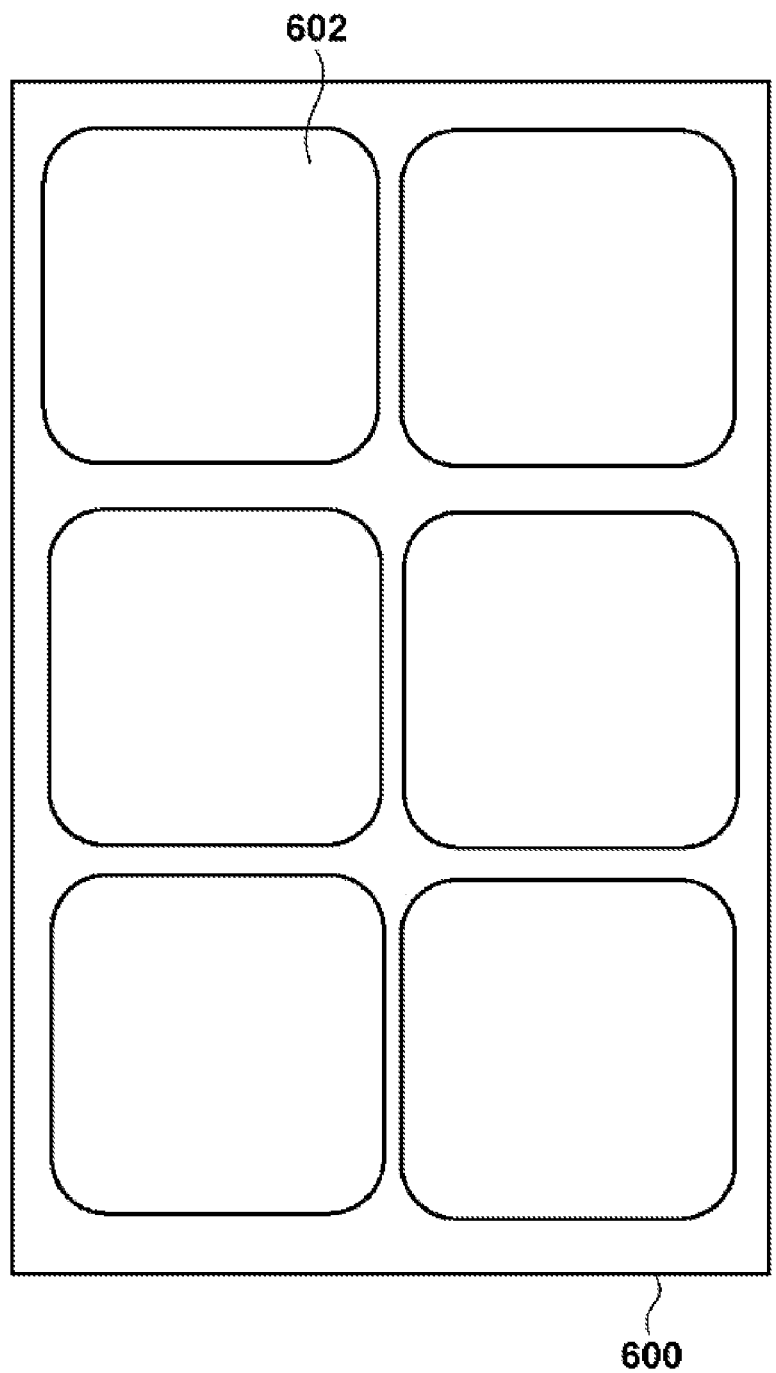
FIG. 11 is a representative screen image of a live streaming selection screen displayed on a display of a viewer's user terminal.

FIG. 11 is a representative screen image of the live-stream selection screen 600 displayed on the display of the viewer user terminal 30. The live-stream selection screen 600 includes thumbnails 602 indicating live-streams in the list of currently available live streams received from the server. The viewer-side UI control unit 202 generates the live-stream selection screen 600 based on the list of live-streams obtained from the server 10 and shows the screen on the display.

Figure 12:
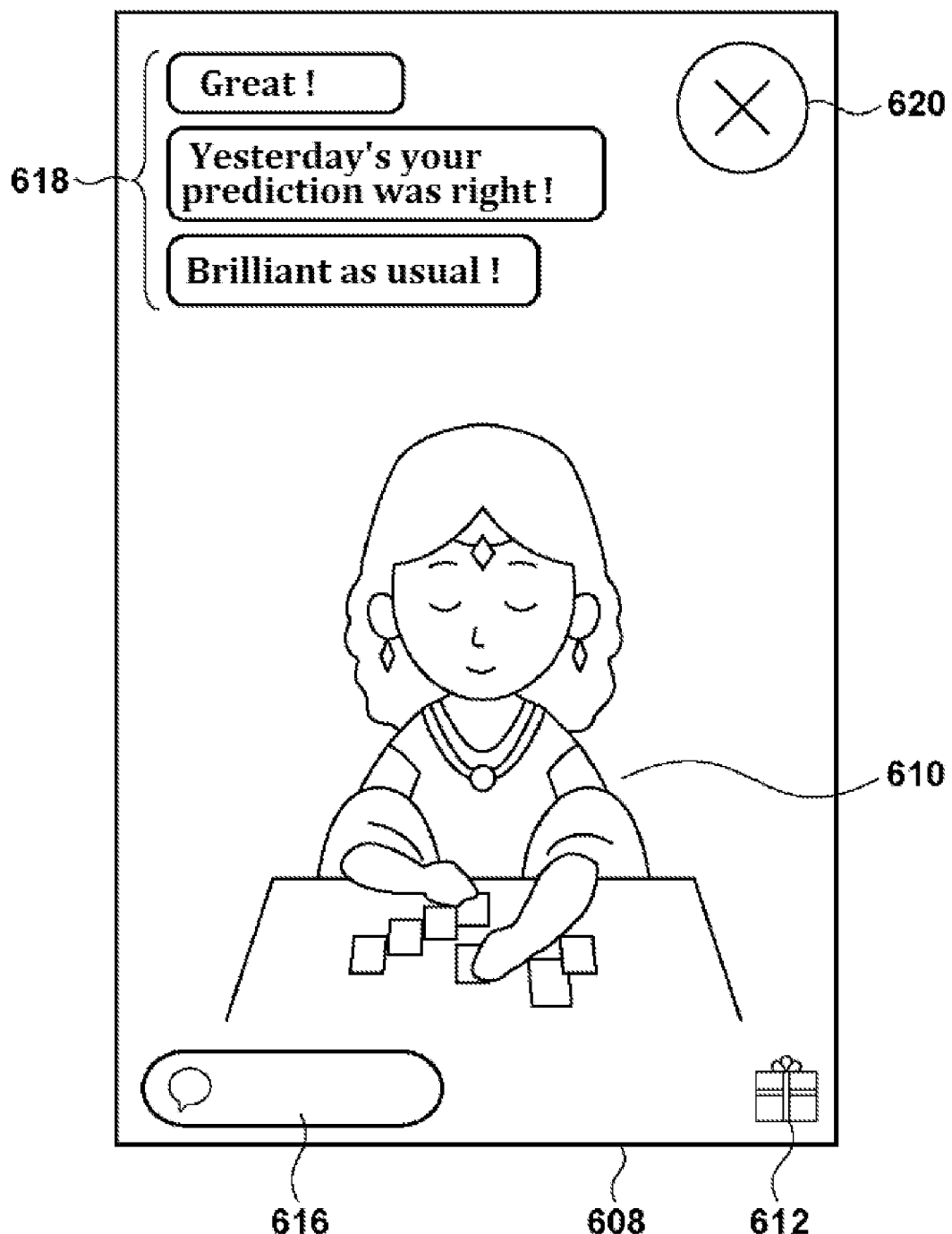
FIG. 12 is a representative screen image of a live streaming room screen displayed on the display of the viewer's user terminal.

FIG. 12 is a representative screen image of a live-streaming room screen 608 shown on the display of the viewer user terminal 30. Once the viewer taps one of the thumbnails 602 on the live-stream selection screen 600 of FIG. 11, the live-streaming room screen 608 of FIG. 12 is shown on the display. The live-streaming room screen 608 displays a video image generated by the user terminal 20 of the distributor in real time. The live-streaming room screen 608 includes a video image 610 of a distributor obtained by reproducing the video data received from the server 10, a gift object 612, a comment input region 616, a comment display region 618, and a quit viewing button 620. The superimposed information generation unit 204 superimposes objects such as the gift object 612, the comment input region 616, the comment display region 618, and the quit viewing button 620 on the video image 610 obtained by reproducing the video data by the viewer-side UI control unit 202 to generate the live-streaming room screen 608.

The comment display region 618 may include a comment entered by the viewer and comments entered by other viewers, and notifications from the system. The notifications from the system include information but who gave which gift to the distributor. The superimposed information generation unit 204 generates the comment display region 618 including comments of other viewers and received from the server 10 and notifications from the system, and the viewer-side UI control unit 202 includes the generated comment display region 618 in the live-streaming room screen 608.

The comment input region 616 accepts comment inputs by the viewer. The input information transmission unit 206 generates a comment input signal that includes the comment entered in the comment input region 616, and transmits the signal to the server 10 over the network NW. At the same time, the superimposed information generation unit 204 updates the comment display region 618 to display the comment entered in the comment input region 616.

The quit viewing button 620 is an object for accepting an instruction from the viewer to quit viewing the live-stream.

When a tap on the gift object 612 is detected, the input information transmission unit 206 of the user terminal 30 generates a gift information request and transmits the request to the server 10 over the network NW. Upon receipt of the gift information request, the server 10 refers to the gift DB 320 to specify gift IDs of available gifts. In this example, since the live-stream is being performed, the gift IDs of the normal gifts are specified, and the gift IDs of the See-you gifts are not specified. The server 10 generates gift information that includes the specified gift ID, and transmits it to the user terminal 30 of the requester. The superimposed information generation unit 204 of the user terminal 30 generates a gift region 622 for receiving selection of the gift based on the received gift information. The gift region 622 includes the gift object of the gift specified by the gift ID included in the gift information. The viewer-side UI control unit 202 displays the generated gift region 622 on the live-streaming room screen 608.

Figure 13:
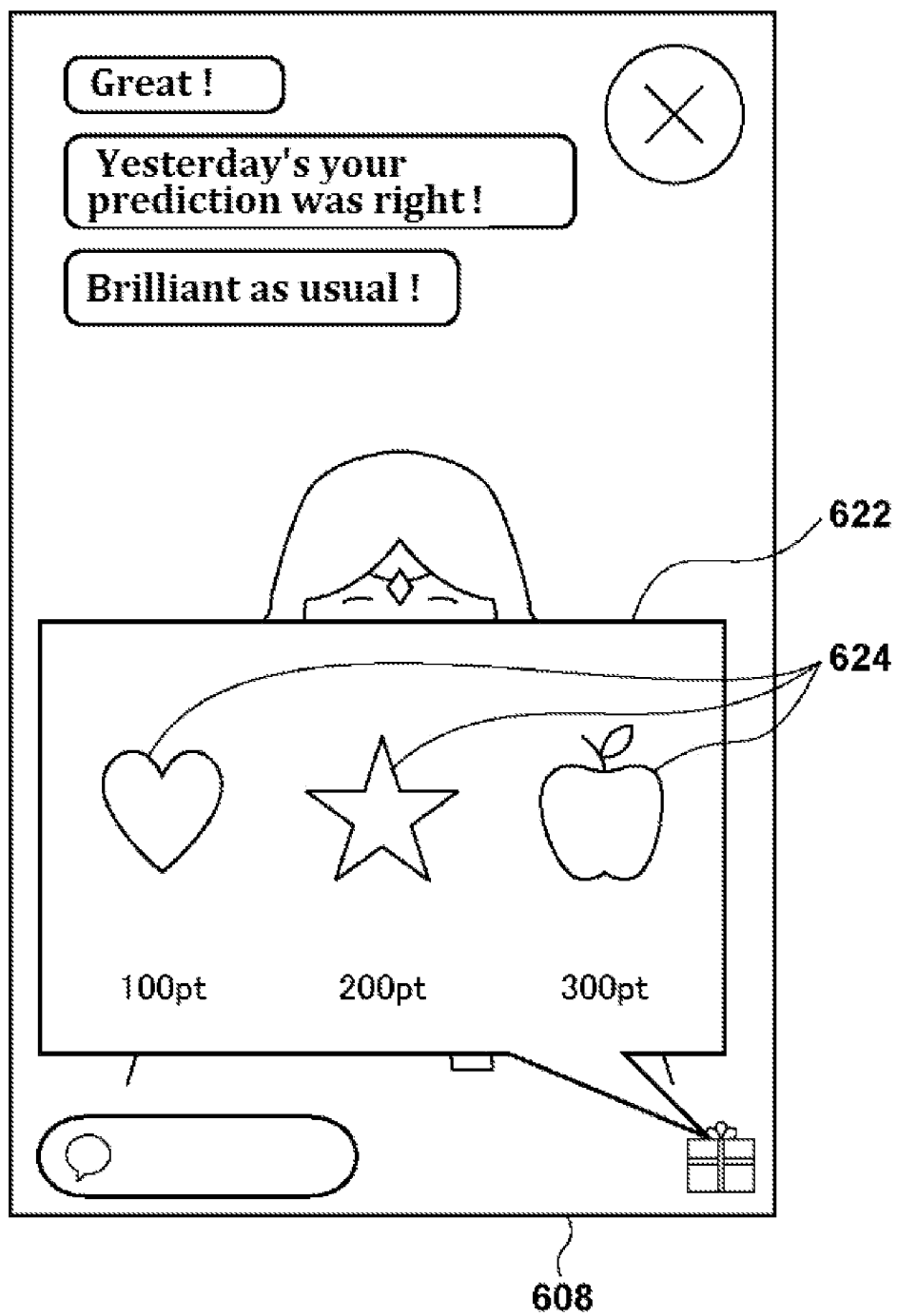
FIG. 13 is a representative screen image of a live-streaming room screen on which a gift region is superimposed on the display of the viewer's user terminal.

FIG. 13 is a representative screen image of a live streaming room screen 608 on which the gift region 622 is superimposed on the display of the viewer's user terminal 30. The gift region 622 includes gift objects 624 of the normal gifts. Once the viewer taps the gift object 624 in the gift region 622 on the live-streaming room screen 608 of FIG. 13, the viewer-side UI control unit 202 of the user terminal 30 accepts the selection of the gift object 624 by the viewer. The superimposed information generation unit 204 generates an effect 626 corresponding to the normal gift represented by the designated gift object 624. The viewer-side UI control unit 202 displays the generated effect 626 on the live-streaming room screen 608. In addition, the input information transmitting unit 206 generates an object specifying signal including the gift ID of the normal gift represented by the selected gift object 624 and transmits it to the server 10.

Figure 14:
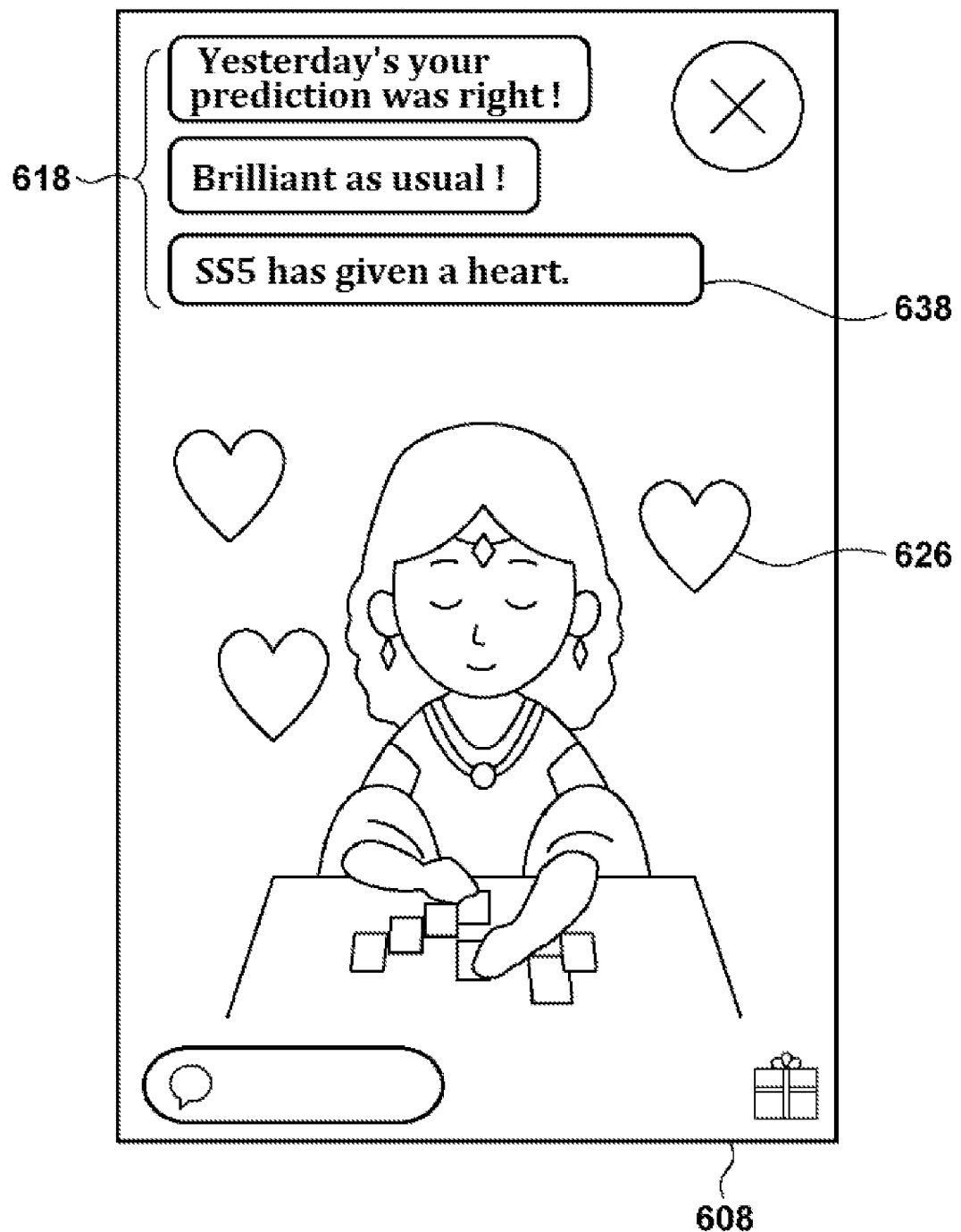
FIG. 14 is a representative screen image of a live-streaming room screen on which an effect is superimposed on the display of the viewer's user terminal.

FIG. 14 is a representative screen image of the live-streaming room 608 screen on which the effect 626 is superimposed on the display of the viewer's user terminal 30. The comment display region 618 of FIG. 14 includes a system message 638 telling that the viewer (user ID "SSS" in this example) has given a normal gift ("heart" in this example) to the distributor. The system message 638 may be included in reply to the object specifying signal described above.

Figure 15:
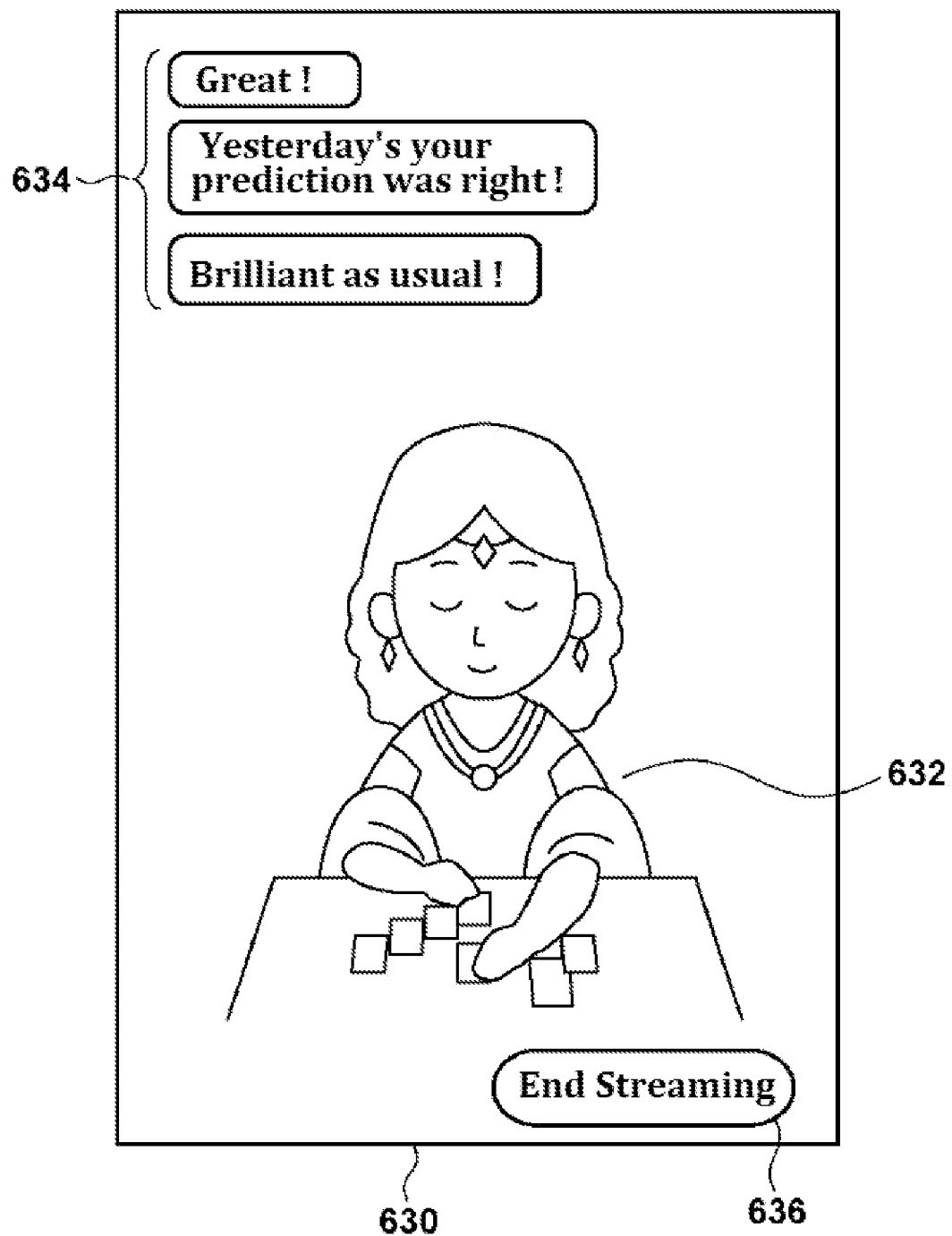
FIG. 15 is a representative screen image of a live streaming room screen displayed on the display of the distributor's user terminal.

FIG. 15 is a representative screen image of a live-streaming room screen 630 shown on the display of the distributor's user terminal. When the distributor starts the live-stream on the user terminal 20, the live-streaming room screen 630 of FIG. 15 is shown on the display. The live-streaming room screen 630 displays a video image generated by the user terminal 20 of the distributor in real time. The live-streaming room screen 630 includes a video image 632 of the distributor obtained by reproducing the video data on the user terminal 20, the comment display region 634, and a streaming end button 636. The video image 632 is substantially the same as the video image 610 of the live-streaming room screen 608 shown on the display of the viewer's user terminal 30. The comment display region 634 is substantially the same as the comment display region 618 of the live-streaming room screen 608 displayed on the display of the viewer's user terminal 30.

Figure 16:
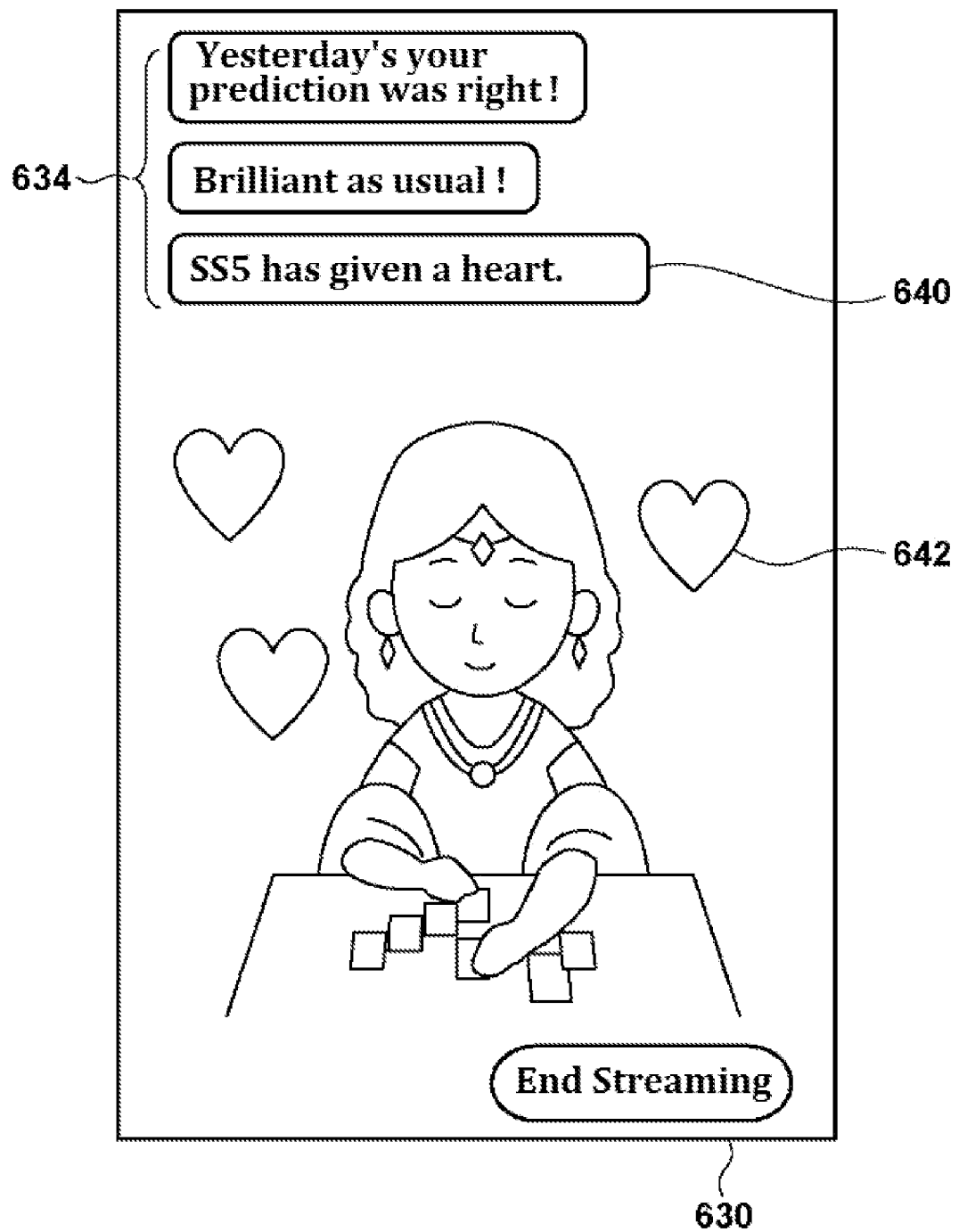
FIG. 16 is a representative screen image of a live-streaming room screen on which an effect is superimposed on the display of the distributor's user terminal.

FIG. 16 is a representative screen image of the live-streaming room screen 630 on which an effect 642 is superimposed on the display of the distributor's user terminal 20. FIG. 16 illustrates the live-streaming room screen 630 shown on the display of the distributor's user terminal 20 when the live-streaming room screen 608 of FIG. 14 is shown on the display of the viewer's user terminal 30. Upon receipt of the viewer's instruction to use the normal gift, the viewer's user terminal 30 generates an object specifying signal that includes the gift ID of the normal gift and transmits the signal to the server 10. The gift processing unit 308 of the server 10 extracts the gift ID and the viewer ID from the received object specifying signal and includes them in an effect generation instruction signal. The gift processing unit 308 transmits the generated effect generation instruction signal to the distributor's user terminal 20 and the user terminals of other viewers. The distributor-side UI control unit 108 of the distributor's user terminal 20 displays an effect based on the received effect generation instruction signal, and updates the comment display region 634. The comment display region 634 of FIG. 16 includes a system message 640 indicating that the viewer gave the normal gift to the distributor. This system message 640 is the same as the system message 638 in the comment display region 618 of FIG. 14.

When the viewer wishes to quit viewing the live-stream, the viewer taps the quit viewing button 620 on the live-streaming room screen 608. When a tap on the quit viewing button 620 is detected, the post-stream control unit 208 of the viewer's user terminal 30 accepts it as an instruction to quit viewing the live-stream. Upon receipt of the instruction, the post-stream control unit 208 generates a live-stream viewing quit signal including the viewer ID of the viewer and the stream ID of the live-stream that the viewer has quit viewing, and transmits the live-stream viewing quit signal to the server 10 over the network NW. At the same time, the post-stream control unit 208 stops displaying the live-streaming room screen 608 on the display, and then shows the live-stream selection screen 600 on which a dialog 646 for inquiring the viewer whether to give a See-you gift to the distributor is superimposed.

Figure 17:
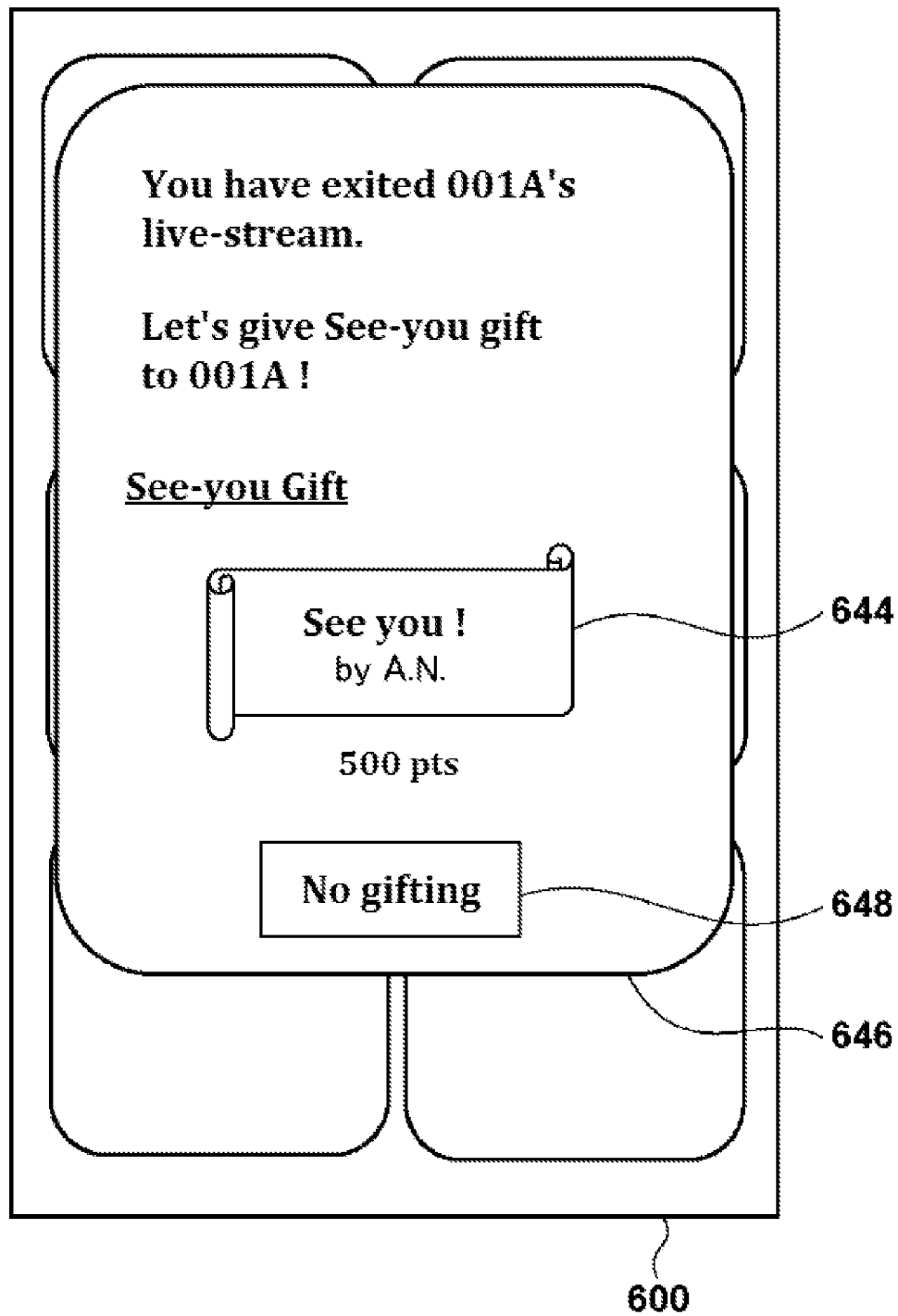
FIG. 17 is a representative screen image of a live-stream selection screen on which a dialog is superimposed on the display of the viewer's user terminal.

FIG. 17 is a representative screen image of the live-stream selection screen 600 on which the dialog 646 is superimposed on the display of the viewer's user terminal 30. The dialog 646 is a screen shown upon quit viewing of the live-stream for asking the viewer whether to use a gift for the distributor of the live-stream. The dialog 646 includes a gift object 644 of the see-you gift and a no-gifting button 648 for accepting an instruction to end the dialog 646 without giving the See-you gift. When the no-gifting button 648 is tapped, the dialog 646 is closed without giving the See-you gift.

Once the viewer taps the gift object 644 on the dialog 646 of FIG. 17, the post-stream control unit 208 of the user terminal 30 accepts the selection of the gift object 644 by the viewer. When receipt of the selection of the gift object 644, the post-stream control unit 208 generates and transmits, to the server 10, a See-you gift use signal that includes the viewer ID of the viewer who instructed the use of the See-you gift corresponding to the gift object 644, the stream ID identifying the live-stream which the viewer quit viewing, the distributor ID of the distributor of the live-stream, and the gift ID identifying the used See-you gift.

When the distributor wishes to quit the live-stream, the distributor taps the streaming end button 636 on the live-streaming room screen 630. When a tap on the streaming end button 636 is detected, the distributor-side UI control unit 108 of the distributor's user terminal 20 accepts it as an instruction to end the live-stream. Upon receipt of the streaming end instruction, the distributor-side UI control unit 108 generates the live-stream end signal and transmits it to the server 10 over the network NW (S204). Thereafter the process described with reference to FIG. 10 is carried out. As a result, when the distributor ends the live-stream, the screen on the display of the viewer's user terminal 30 is changed from the live-streaming room screen 608 to a post-stream screen 650.

Figure 18:
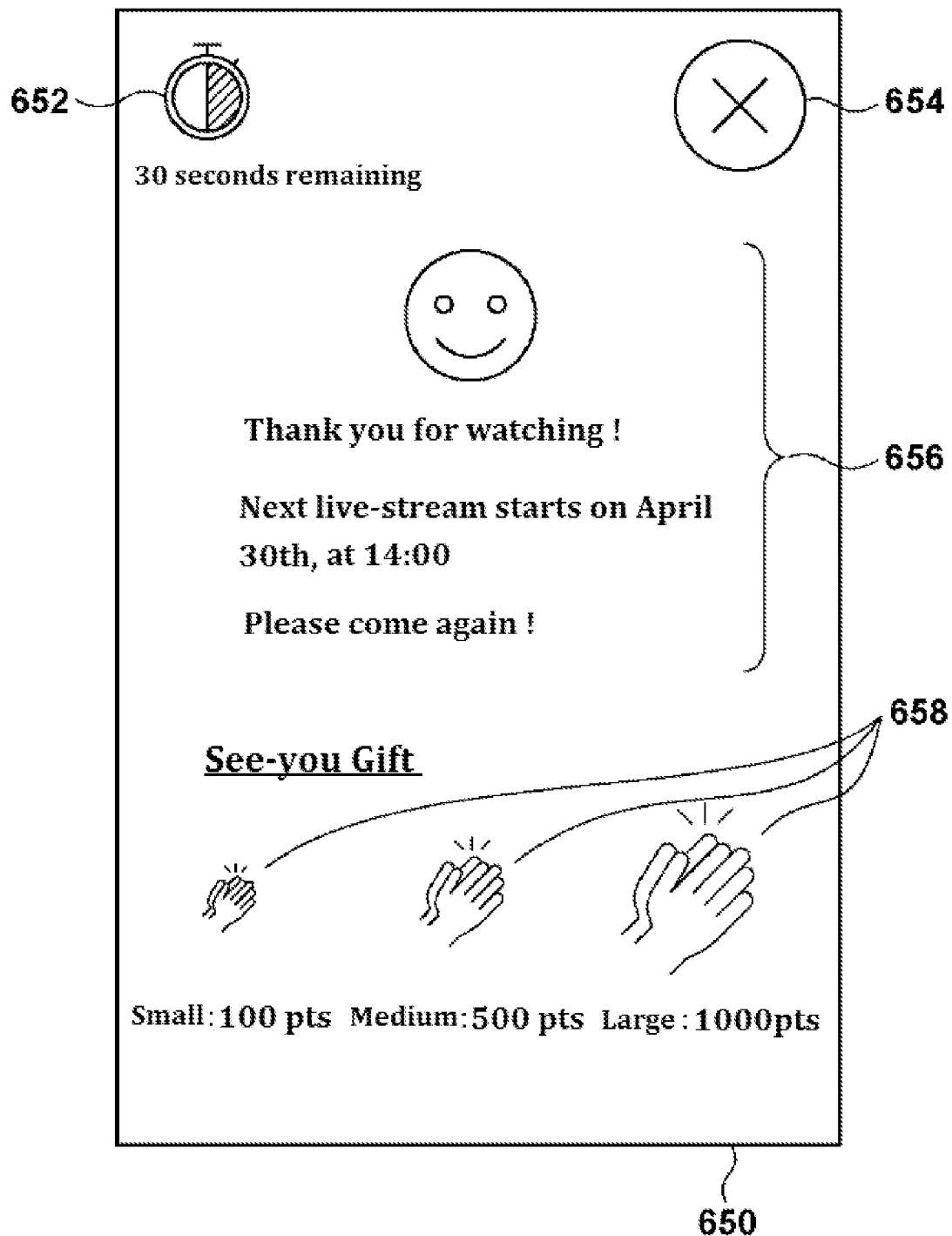
FIG. 18 is a representative screen image of a post streaming screen displayed on the display of the viewer's user terminal.

FIG. 18 is a representative screen image of the post-stream screen 650 shown on the display of the viewer's user terminal 30. The post-stream screen 650 includes a timer object 652 indicating the remaining time of the collection period of the ended live-stream, an end button 654, a post-stream image 656 registered in advance by the distributor of the ended live-stream, and gift objects 658 of the See-you gifts. Upon detection of a tap on the end button 654, the post-stream control unit 208 of the user terminal 30 terminates the collection period at that point regardless of the remaining time of the collection period, and changes the screen on the display from the post-stream screen 650 to the live-stream selection screen 600. The post-stream control unit 208 also changes the screen from the post-stream screen 650 to the live-stream selection screen 600 when the remaining time of the collection period becomes zero without the end button 654 being tapped (also when the collection period expires). As a result, the post-stream control unit 208 can accept an instruction to use the See-you gift only during the collection period.

The post-stream control unit 208 of the user terminal 30 accepts the instruction to use the See-you gift on the post-stream screen 650. Upon detection of a tap on the gift object 658 on the post-stream screen 650, the post-stream control unit 208 generates and transmits the See-you gift use signal including the gift ID of the See-you gift corresponding to the tapped gift object 658 to the server 10 over the network NW.

Figure 19:
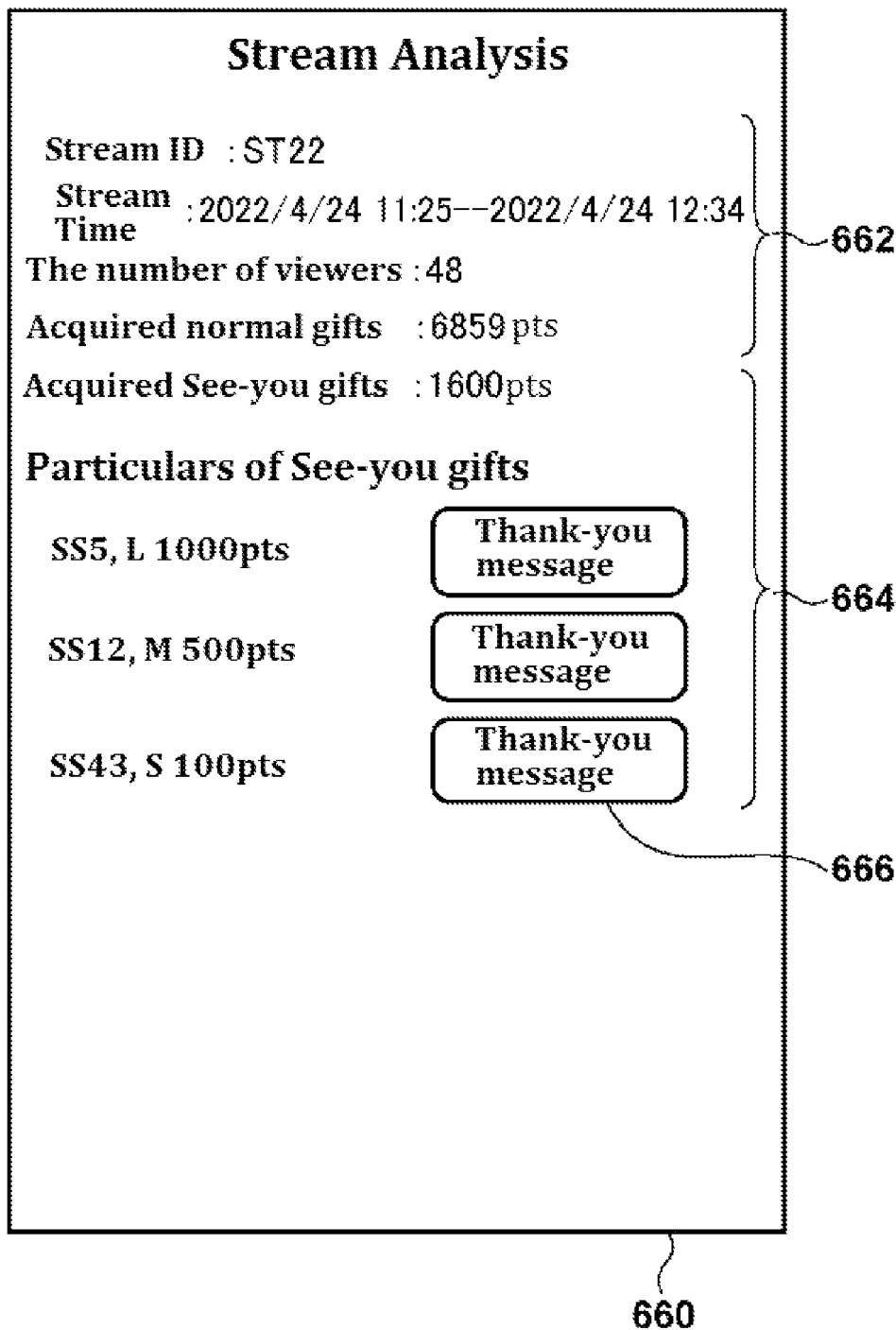
FIG. 19 is a representative screen image of a live-stream analysis screen displayed on the display of the distributor's user terminal.

FIG. 19 is a representative screen image of a live-stream analysis screen 660 displayed on the display of the distributor's user terminal 20. The live-stream analysis screen 660 includes a metric display region 662 for showing various metrics of past live-streams of the distributor, and a See-you gift information display region 664 for showing information about the See-you gifts used by viewers on the post-stream screen appeared after the live-stream. The See-you gift information display region 664 is configured to allow the distributor to send messages to the viewers who have used the See-you gifts. The See-you gift information display region 664 includes the total of the price points of the See-you gifts received by the distributor in relation to the live-stream(s) to be analyzed, detailed information about the See-you gifts including who used which See-you gift, and a thank-you message button(s) 666 for accepting an instruction to send a thank-you message to the giver of each See-you gift received.

When a tap on the thank-you message button 666 is detected, the distribution-side UI control unit 108 generates and transmits, to the server 10 over the network NW, a thank-you message registration request including the distributor ID of the distributor, and the viewer ID of the sender and the gift ID of the See-you gift corresponding to the tapped thank-you message button 666. The timeline update unit 330 of the server 10 updates the timeline DB 336 to include or post, in the timeline of the viewer with the viewer ID included in the received thank-you message registration request, the thank-you message from the distributor including the information on the See-you gift specified by the gift ID included in the thank-you message registration request. The thank-you message may be created by filling in the blanks on a predefined message form with the information included in the thank-you message registration request. In the illustrated message form "From (blank 1), Thank you for (blank 2) for the live-stream on (date)", the user may enter the distributor ID included in the thank-you message registration request in (blank 1), enter the date of the live-stream in (date), and enter the type of See-you gift specified by the gift ID included in the request in (blank 2).

Alternatively, the thank-you message may be generated at the user terminal 20 of the distributor. In this case, upon detection of a tap on the thank-you message button 666, the distributor-side UI control unit 108 causes the display to show a screen for accepting input of a thank-you message. The viewer ID of the viewer to whom the message is to be sent may be pre-entered on the screen. This saves the distributor the trouble of filling out such information.

Figure 20:
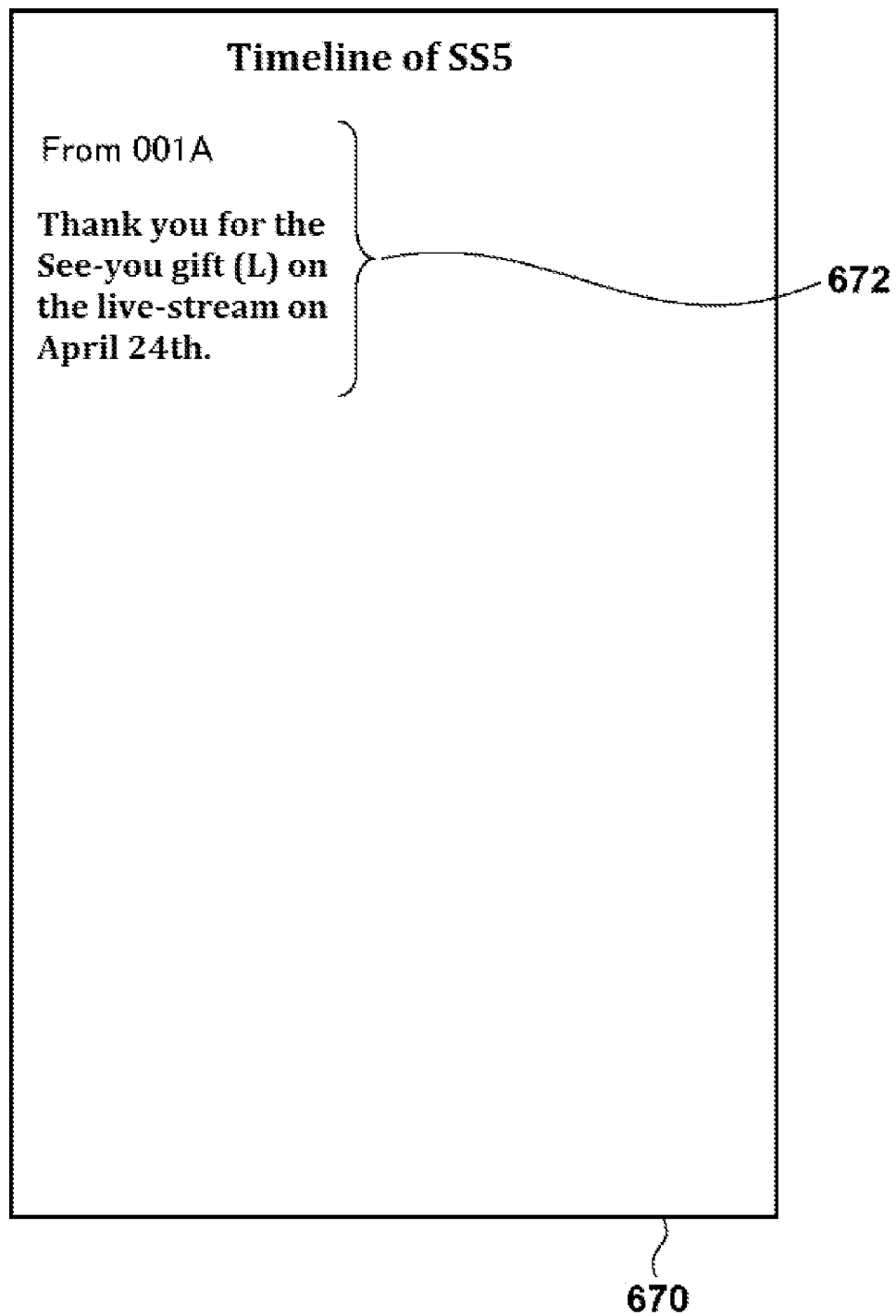
FIG. 20 is a representative screen image of a timeline screen displayed on the display of the viewer's user terminal.

FIG. 20 is a representative screen image of a timeline screen 670 displayed on the display of the viewer's user terminal 30. The timeline screen 670 includes a thank-you message 672 from the distributor to a viewer.

In the above embodiment, an example of the holding unit includes a hard disk or semiconductor memory. It is understood by those skilled in the art that each element or component can be realized by a CPU not shown, a module of an installed application program, a module of a system program, or a semiconductor memory that temporarily stores the contents of data read from the hard disk, and the like.

The live-streaming system 1 of the embodiment allows viewers to send the See-you gifts to a distributor during the collection period after the live-stream ends or immediately after exiting the live-stream. Information about the See-you gifts received by the distributor is notified to the distributor in non-real time. This allows the viewers to support the distributor simply by showing their gratitude through gifting without having the distributor read out their messages (about their gifting) or the like. In this way, realized is the live-streaming platform that makes viewers who, for example, do not wish to stand out but want to support the distributor feel easy about supporting the distributor.

In the live-streaming system 1, the post-stream image prepared by the distributor is shown on the screen during the collection period after the live-stream. After the collection period, the system stops accepting gifting of the See-you gifts. This makes it possible to realize the collection period for the See-you gifts in a non-intrusive manner on the application. As an example of a real-world tipping, there is a monkey dance performed at Senso-ji Temple or other places. In the monkey dance show, a high-level performance is successfully completed at the end of the show, after which the monkey comes running up to audience with a collection box, and the audience is tempted to throw coins into the box. The embodiment realizes such a non-intrusive method of collecting a tip with the application.

In addition, since the live-streaming system 1 of the embodiment allows the viewers to choose whether to give a See-you gift after the live-stream ends or after they stop watching the live-stream before the end of the live-stream, the amount of such See-you gift usage depends more on the quality of the content than the length of the live-stream.

Thus, the system provides a rewarding structure which gives more rewards to distributors who provide high quality performances in a short time.

Further, in the live-stream system 1, notification related to the See-you gift that is given by a viewer after the viewer has stopped watching the live-stream before its end is done in a non-real-time manner. In other words, when the See-you gift is sent to the distributor, it does not appear as an effect on the live-streaming room screen. However the fact that the See-you gift was given is notified to the distributor through the live-stream analysis screen. Thus, it is possible to balance the viewer's feeling of "I don't want to be called by name during the live-stream, but I want to support the distributor" or "I want to show my affection" and the distributor's feeling of "I am glad to know that so many people support me" or "Knowing that some viewers left during the live-stream may lead to a decrease in motivation."

Figure 21:
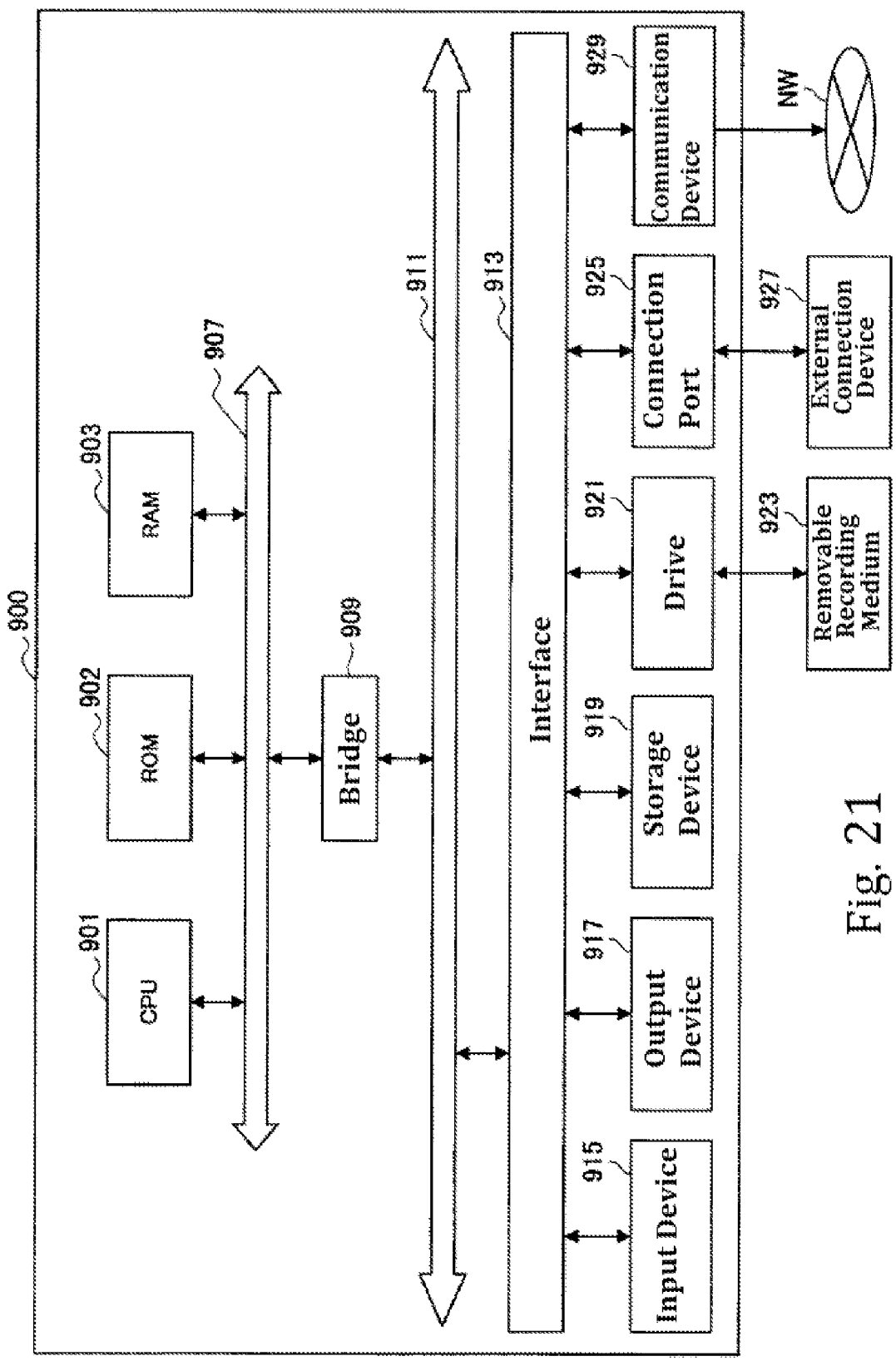
FIG. 21 is a block diagram showing an example of a hardware configuration of an information processing device according to the embodiment.

Referring to FIG. 21, the hardware configuration of the information processing device will be now described. FIG. 21 is a block diagram showing an example of a hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 903, and RAM (Random Access Memory) 905. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 903, the RAM 905, the storage device 919, or the removable recording medium 923. For example, the CPU 901 controls the overall operation of each functional unit included in the server 10 and the user terminals 20 and 30 in the embodiment. The ROM 903 stores programs, calculation parameters, and the like used by the CPU 901. The RAM 905 serves as a primary storage that stores a program used in the execution of the CPU 901, parameters that appropriately change in the execution, and the like. The CPU 901, ROM 903, and RAM 905 are interconnected to each other by a host bus 907 which may be an internal bus such as a CPU bus. Further, the host bus 907 is connected to an external bus 911 such as a PCI (Peripheral Component Interconnect/Interface) bus via a bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing unit 900 as text, video such as images, or sound such as audio.

The storage device 919 is a device for storing data configured as an example of a storage unit of the information processing equipment 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for a removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 905. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is an imaging element such as a CCD (Charge Coupled Device) or CMOS (Complementary Metal Oxide Semiconductor), and a device that captures an image of the real space using various elements such as lenses for controlling image formation of a subject on the imaging element to generate the captured image. The image capturing device may capture a still image or may capture a moving image.

The configuration and operation of the live-streaming system 1 in the embodiment have been described. This embodiment is a merely example, and it is understood by those skilled in the art that various modifications are possible for each component and a combination of each process, and that such modifications are also within the scope of the present disclosure.

In the above embodiment, the dialog 646 appears to inquire a viewer whether to send a See-you gift after the viewer stops watching the live-stream before the end of the live-stream. However, the disclosure is not limited to this. There are three more examples of the configuration in which a viewer gives a See-you gift to the distributor when the viewer stops watching the live-stream.

First Modification Example: When an instruction to use a See-you gift is accepted in the dialog 646, the distributor is notified of the gifting in real time.

Second Modification Example: Instead of the dialog 646, the See-you gifts are included in the available gifts during the live-stream.

Third Modification Example: Instead of the dialog 646, when a viewer taps the quit viewing button 620 and before the viewer actually stops watching the live-stream, a dialog to inquire about gifting to the viewer is shown.

The following describes each of these modification examples.

First Modification Example

When a tap on the gift object 644 is detected in the dialog 646 of FIG. 17, the post-stream control unit 208 of the viewer's user terminal 30 generates the See-you gift use signal and sends it to the server 10. The gift processing unit 308 of the server 10 extracts the gift ID and the viewer ID from the received See-you gift use signal and includes them in the effect generation instruction signal. The gift processing unit 308 transmits the generated effect generation instruction signal to the distributor's user terminal 20 and the user terminals of other viewers. The distributor-side UI control unit 108 of the distributor's user terminal 20 displays an effect based on the received effect generation instruction signal, and updates the comment display region 634.

In this case, the See-you gift effect is shown on the live-streaming room screen after the giver viewer of the See-you gift has stopped watching the live-stream. In this way, the distributor is able to know in real time that the distributor has received the See-you gift from the giver viewer. In addition, the sender viewer has already left from the live-stream when the See-you gift effect is shown, so it is relatively inconspicuous.

The effect of the See-you gift may include the initial of the giver, or the initial alphabets itself may be used as the effect.

Second Modification Example

In this modification example, the viewer's user terminal 30 accepts an instruction from the viewer to use the See-you gift during the live-stream and stops displaying the video image related to the live-stream in response to the acceptance of the instruction to use the See-you gift. The notification related to the used See-you gift is provided to the distributor in non-real time.

Figure 22:
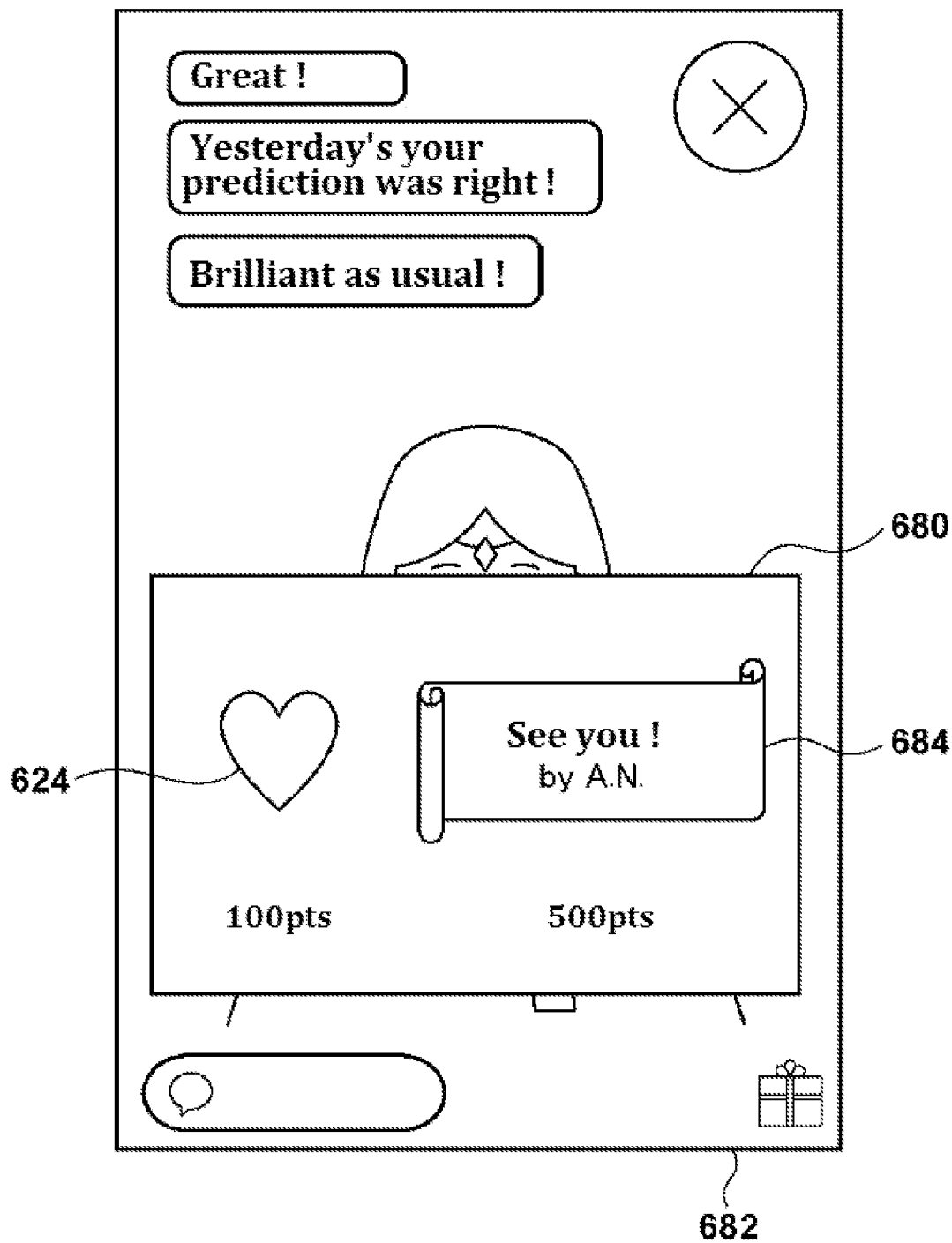
FIG. 22 is a representative screen image of a live-streaming room screen on which a gift region is superimposed on the display of the viewer's user terminal.

FIG. 22 is a representative screen image of a live-streaming room screen 682 on which a gift region 680 is superimposed on the display of the viewer's user terminal 30. The gift region 680 includes a gift object 624 of the normal gift and a gift object 684 of the See-you gift. Once the viewer taps the gift object 684 in the gift region 680 on the live-streaming room screen 682 of FIG. 22, the post-stream control unit 208 of the user terminal 30 accepts use of the See-you gift corresponding to the gift object 684 by the viewer. The post-stream control unit 208 generates the See-you gift use signal including the gift ID of the See-you gift represented by the gift object 684 and transmits the signal to the server 10. At the same time, the post-stream control unit 208 stops displaying the live-streaming room screen 682 in response to receipt of the instruction to use the See-you gift. The process performed by the server 10 when the See-you gift use signal is received is similar to the corresponding process in the above embodiment.

Similarly to the first modification example, the notification related to the used gift may be provided to the distributor in real time. Specifically, the post-stream control unit 208 may show the corresponding effect on the display in response to acceptance of the instruction to use the See-you gift. When showing of the effect finishes, the post-stream control unit 208 may stop showing the live-streaming room screen 682. At the same time, the post-stream control unit 208 may generate the See-you gift use signal including the gift ID of the See-you gift represented by the gift object 684 and transmit the signal to the server 10. The server 10 may extract the gift ID and the viewer ID from the received See-you gift use signal and include them in the effect generation instruction signal. The gift processing unit 308 may transmit the generated effect generation instruction signal to the distributor's user terminal 20 and the user terminals of other viewers. The distributor-side UI control unit 108 of the distributor's user terminal 20 may display an effect based on the received effect generation instruction signal, and update the comment display region 634.

Third Modification Example

Figure 23:
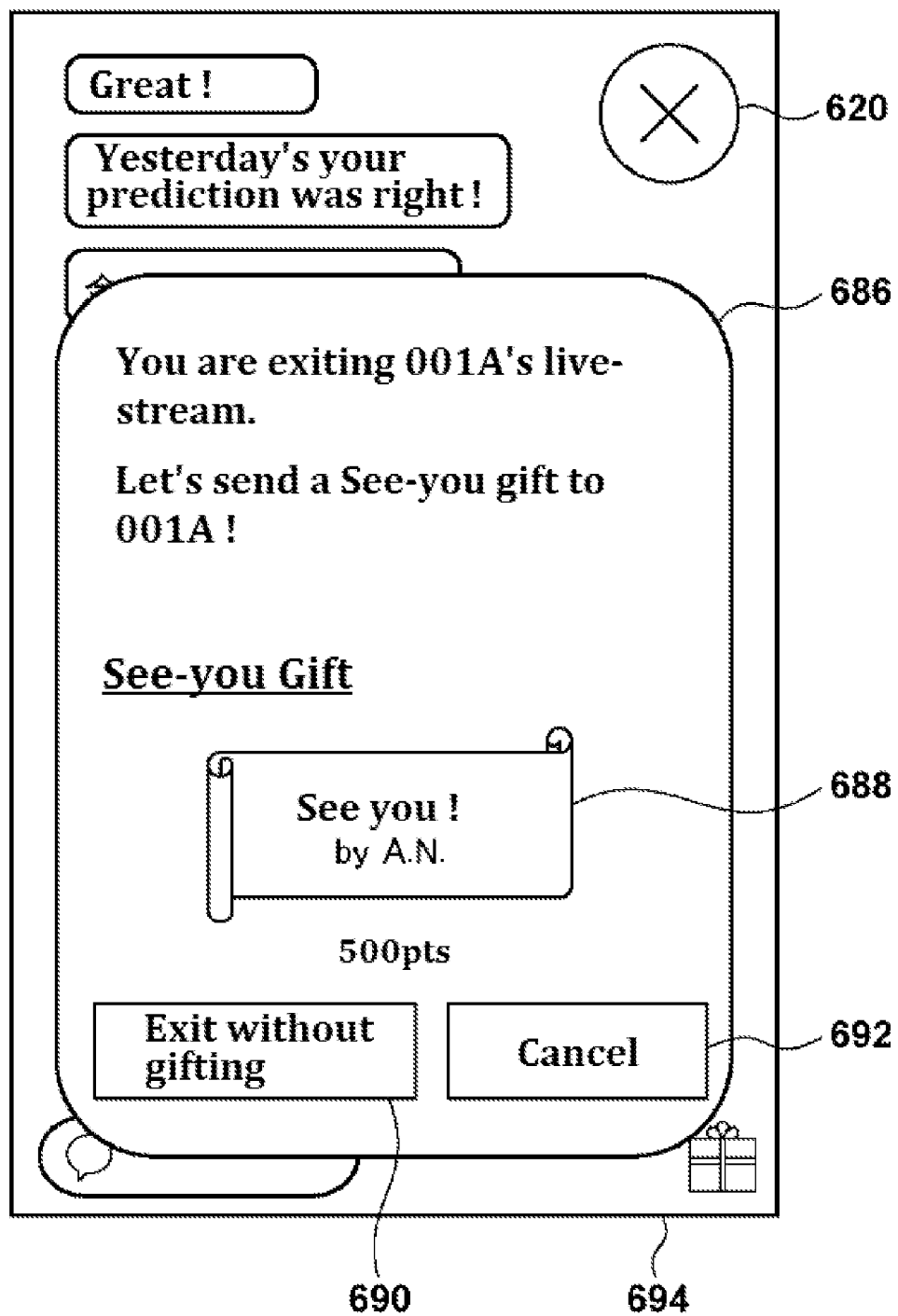
FIG. 23 is a representative screen image of a live-streaming room screen on which a dialog is superimposed on the display of the viewer's user terminal.

FIG. 23 is a representative screen image of a live-streaming room screen 694 on which the dialog 686 is superimposed on the display of the viewer's user terminal 30. Upon detection of a tap on the quit viewing button 620 on the live-streaming room screen 694, the post-stream control unit 208 of the user terminal 30 generates and superimpose the dialog 686 asking the viewer whether to give the distributor a See-you gift on the live-streaming room screen 694. The dialog 686 is a screen shown upon quit viewing of the live-stream for asking the viewer whether to use the See-you gift for the distributor of the live-stream. The dialog 686 includes a gift object 688 of the See-you gift, an exit button 690 for accepting an instruction to end the dialog 686 without giving the See-you gift and stop viewing the live-stream, and a cancel button 692.

Upon tap on the gift object 688 in the dialog 686 of FIG. 23 by the viewer, the post-stream control unit 208 of the user terminal 30 generates and transmits, to the server 10, a See-you gift use signal that includes the viewer ID of the viewer who instructed the use of the See-you gift corresponding to the gift object 688, the stream ID identifying the live-stream which the viewer is about to quit viewing, the distributor ID of the distributor of the live-stream, and the gift ID identifying the used See-you gift. At the same time, the post-stream control unit 208 stops displaying the live-streaming room screen 694 in response to receipt of the instruction to use the See-you gift. The process performed by the server 10 when the See-you gift use signal is received is similar to the corresponding process in the above embodiment. Similarly to the first modification example, the notification related to the used gift may be provided to the distributor in real time.

The conversion rate from the points paid for the gift to the granted reward in the embodiment is merely example, and the conversion rate may be appropriately set by the administrator of the live-streaming system 1, for example.

The technical idea according to the embodiment may be applied to live commerce or virtual live-streaming using an avatar that moves in synchronization with the movement of the distributor instead of the image of the distributor.

The procedures described herein, particularly those described with a flow diagram, a flowchart, are susceptible of omission of part of the steps constituting the procedure, adding steps not explicitly included in the steps constituting the procedure, and/or reordering the steps. The procedure subjected to such omission, addition, or reordering is also included in the scope of the present invention unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the user terminal where the video data is reproduced may be performed by the server 10 or may be performed by the user terminal where the video data is generated.

What is claimed is:

1. A terminal of a viewer who participates in a live-stream, comprising:
    one or more processors; and
    memory storing one or more computer programs configured to be executed by the one or more processors,
    the one or more computer programs including instructions for:
        causing transition from a live-stream screen to a post-stream screen when a distributor of the live-stream ends the live-stream, the post-stream screen being displayed on a display in response to ending the live-stream, the live-stream screen showing a video image generated by a terminal of the distributor, the post-stream screen showing a predetermined image; and
        accepting an instruction on the post-stream screen for the viewer to give a gift to the distributor of the live-stream which has been ended by the distributor and in which the distributor and the viewer participated.

2. The terminal of claim 1, wherein the accepting includes accepting the instruction to give the gift only in a predetermined period of time.

3. The terminal of claim 1, wherein the predetermined image is an image registered in advance by the distributor of the live-stream.

4. The terminal of claim 1, wherein notification related to the given gift is provided to the distributor in non-real time.

5. The terminal of claim 1, wherein the one or more computer programs further includes instructions for:
    accepting an instruction to stop participating in the live-stream from the viewer; and
    upon stopping participation in the live-stream, showing a screen on the display asking the viewer whether to give the gift to the distributor of the live-stream.

6. The terminal of claim 1, wherein the one or more computer programs further includes instructions for:
    accepting the instruction for the viewer to give the gift to the distributor of the live-stream during the live-stream; and
    upon giving the gift to the distributor of the live-stream, cease displaying the video image related to the live-stream.

7. The terminal of claim 6, wherein notification related to the given gift is provided to the distributor in non-real time.

8. The terminal of claim 6, wherein the one or more computer programs further includes instructions for, upon giving the gift to the distributor of the live-stream, showing an effect corresponding to the gift on the display,
    wherein the cease displaying includes no longer showing the video image related to the live-stream when showing of the effect finishes.

9. The terminal of claim 1, wherein the one or more computer programs further includes instructions for causing transition from the post-stream screen to a live-stream selection screen in which other live-streams are selectable.

10. The terminal of claim 1, wherein the accepting further includes accepting an instruction to give the gift only in a predetermined period of time after the distributor ends the live-stream.

11. A terminal of a viewer who participates in a live-stream, comprising:
    one or more processors; and
    memory storing one or more computer programs configured to be executed by the one or more processors,
    the one or more computer programs including instructions for:
        accepting an instruction for the viewer to give a first gift to a distributor of the live-stream during the live-stream;
        causing transition from a live-stream screen to a post-stream screen when the distributor of the live-stream ends the live-stream, the post-stream screen being displayed on a display in response to ending the live-stream, the live-stream screen showing a video image generated by a terminal of the distributor, the post-stream screen showing a predetermined image; and
        accepting an instruction on the post-stream screen for the viewer to give a second gift to the distributor of the live-stream which has been ended by the distributor and in which the distributor and the viewer participated,
    wherein notification related to the given first gift is provided to the distributor in real time, and
    wherein notification related to the given second gift is provided to the distributor in non-real time.

12. A method, comprising:
    causing a screen of a terminal of a viewer who participates in a live-stream to transition from a live-stream screen to a post-stream screen when a distributor of the live-stream ends the live-stream, the post-stream screen being displayed on a display in response to ending the live-stream, the live-stream screen showing a video image generated by a terminal of the distributor, the post-stream screen showing a predetermined image; and
    accepting an instruction on the post-stream screen for the viewer to give a gift to the distributor of the live-stream which has been ended by the distributor and in which the distributor and the viewer participated.

13. The method of claim 12, wherein the accepting further includes accepting an instruction to give the gift only in a predetermined period of time.

14. The method of claim 12, wherein the predetermined image is an image registered in advance by the distributor of the live-stream.

15. The method of claim 12, wherein notification related to the given gift is provided to the distributor in non-real time.

16. The method of claim 12, further comprising:
accepting an instruction to stop participating in the live-stream from the viewer; and
upon stopping participation in the live-stream, showing a screen on the display asking the viewer whether to give the gift to the distributor of the live-stream.

17. The method of claim 12, further comprising:
accepting the instruction for the viewer to give the gift to the distributor of the live-stream during the live-stream; and
upon giving the gift to the distributor of the live-stream, cease displaying the video image related to the live-stream.

18. The method of claim 17, wherein notification related to the given gift is provided to the distributor in non-real time.

19. The method of claim 17, further comprising, upon giving the gift to the distributor of the live-stream, showing an effect corresponding to the gift on the display,
wherein the cease displaying includes no longer showing the video image related to the live-stream when showing of the effect finishes.

20. The method of claim 12, further comprising transitioning the screen from the post-stream screen to a live-stream selection screen in which other live-streams are selectable.

* * * * *